US012601851B2

(12) United States Patent
Maghoul et al.

(10) Patent No.: US 12,601,851 B2
(45) Date of Patent: Apr. 14, 2026

(54) SYSTEMS AND METHODS FOR IN-SITU CHARACTERIZATION OF PERMAFROST SITES

(71) Applicant: UNIVERSITY OF MANITOBA, Winnipeg (CA)

(72) Inventors: Pooneh Maghoul, Winnipeg (CA); Hongwei Liu, Winnipeg (CA); Guillaume Mantelet, Winnipeg (CA); Ahmed Shalaby, Winnipeg (CA)

(73) Assignee: UNIVERSITY OF MANITOBA, Winnipeg (CA)

( * ) Notice: Subject to any disclaimer, the term of this patent is extended or adjusted under 35 U.S.C. 154(b) by 53 days.

(21) Appl. No.: 18/561,800

(22) PCT Filed: May 18, 2022

(86) PCT No.: PCT/CA2022/050785
§ 371 (c)(1),
(2) Date: Nov. 17, 2023

(87) PCT Pub. No.: WO2022/241555
PCT Pub. Date: Nov. 24, 2022

(65) Prior Publication Data
US 2024/0255664 A1      Aug. 1, 2024

Related U.S. Application Data

(60) Provisional application No. 63/190,310, filed on May 19, 2021.

(51) Int. Cl.
*G01V 1/30* (2006.01)
*G01V 1/28* (2006.01)

(52) U.S. Cl.
CPC .............. *G01V 1/303* (2013.01); *G01V 1/284* (2013.01)

(58) Field of Classification Search
CPC ......... G01V 1/303; G01V 1/284; G01V 1/003
See application file for complete search history.

(56) References Cited

U.S. PATENT DOCUMENTS

| | | | |
|---|---|---|---|
| 10,955,577 B2 * | 3/2021 | Deger .................... | G01V 1/303 |
| 2019/0235107 A1 * | 8/2019 | Deger .................... | G01V 1/303 |
| 2024/0255664 A1 * | 8/2024 | Maghoul ................ | G01V 1/284 |

FOREIGN PATENT DOCUMENTS

| | | | | |
|---|---|---|---|---|
| CA | 2364250 C | * | 1/2010 | ............. C09K 8/428 |
| CN | 115407397 B | * | 3/2025 | ............. G06F 30/20 |

(Continued)

OTHER PUBLICATIONS

Goyal et al. Rayleigh-Type Surface Waves in a Swelling Porous Half-Space, Apr. 4, 2016, .pp. 91-109. (Year: 2016).*

(Continued)

*Primary Examiner* — Daniel Pihulic
(74) *Attorney, Agent, or Firm* — Osha Bergman Watanabe & Burton LLP

(57) ABSTRACT

A method of quantifying a plurality of parameters of a subsurface structure comprising a region of interest, the method comprising the steps of: with at least one vibratory source, emitting an input wave signal into the subsurface structure to cause generation of seismic wave signals in the subsurface structure; with at least one receiver, acquiring and measuring the seismic wave signals from the subsurface structure, wherein the seismic wave signals comprise at least one first Rayleigh wave (R1) signal and at least one second Rayleigh wave (R2) signal associated with the region of interest; generating, at a data processing apparatus, seismic data associated with measurements of the seismic wave signals; determining, at the data processing apparatus, from the seismic data a relationship between the Rayleigh wave (R1, R2) signals, wherein the Rayleigh wave (R1, R2)

(Continued)

signals are dependent on at least one of the plurality of parameters.

35 Claims, 13 Drawing Sheets

(56)                    References Cited

FOREIGN PATENT DOCUMENTS

CN            115437008 B  *  5/2025  ............. G01V 1/303
WO      WO-2022241555 A1 *  11/2022  ............. G01V 1/303

OTHER PUBLICATIONS

Md Abul Ehsan Bhuiyan et al., "Use of very high spatial resolution commercial satellite imagery and deep learning to automatically map ice-wedge polygons across tundra vegetation types" Journal of Imaging, 2020, vol. 6, No. 137, pp. 1-16(16 pages).

Laura L Brothers et al., "ubsea ice-bearing permafrost on the us beaufort margin: 1. minimum seaward extent defined from multi-channel seismic reflection data" Geochemistry, Geophysics, Geosystems, 2016, 17(11), pp. 4354-5365 (12 pages).

José M. Carcione et al., "A generalized Biot-Gassmann model for the acoustic properties of shaley sandstones1", Geophysical Prospecting, 2000, vol. 48, No. 3, pp. 539-557 (19 pages).

José M Carcione et al., "Wave simulation in partially frozen porous media with fractal freezing conditions", Journal of Applied Physics, 2003, vol. 94, No. 12, pp. 7839-7847 (9 pages).

José M Carcione et al., "Wave simulation in frozen porous media", Journal of Computational Physics, 2001,vol. 170, No. 2, pp. 676-695 (20 pages).

Hanne H Christiansen et al., "Progress in understanding the dynamics, internal structure and palaeoenvironmental potential of ice wedges and sand wedges", Permafrost and Periglacial Processes, 2001, vol. 27, No. 4, pp. 365-376 (12 pages).

Nicole J Couture et al., "A model for quantifying ground-ice volume, yukon coast, western arctic Canada", Permafrost and Periglacial Processes, 2017, vol. 28, No. 3, pp. 534-542 (9 pages).

Shan Dou et al., "Full-wavefield inversion of surface waves for mapping embedded low-velocity zones in permafrost", Geophysics, 2014, vol. 79, No. 6, pp. EN107-EN124 (18 pages).

Michal Glazer et al., "Spatial distribution and controls of permafrost development in non-glacial Arctic catchment over the Holocene, Fuglebekken, SW spitsbergen" Geomorphology, 2020, vol. 358, 107128, pp. 1-17 (17 ages).

Christian Hauck, "New concepts in geophysical surveying and data interpretation for permafrost terrain", Permafrost and Periglacial Processes, 2013, vol. 24, No. 2, pp. 131-137 (7 pages).

M.B. Helgerud et al., "Elastic-wave velocity in marine sediments with gas hydrates: Effective medium modeling", Geophysical Research Letters, 1999, vol. 26, No. 13, pp. 2021-2024 (4 pages).

Christin Hilbich et al., "Applicability of electrical resistivity tomography monitoring to coarse blocky and ice-rich permafrost landforms", Permafrost and Periglacial Processes, 2009, vol. 20, No. 3, pp. 269-284 (16 pages).

Stephanie R James et al., "Insights into permafrost and seasonal active-layer dynamics from ambient seismic noise monitoring", Journal of Geophysical Research: Earth Surface, 2019, vol. 124, No. 7, pp. 1798-1816 (19 pages).

Christof Kneisel et al., "Advances in geophysical methods for permafrost investigations", Permafrost and periglacial processes, 2008, vol. 19, No. 2, pp. 157-178 (22 pages).

Ph Leclaire et al., "Extension of biot theory of wave propagation to frozen porous media", The Journal of the Acoustical Society of America, 1994, vol. 96, No. 6, pp. 3753-3768 (16 pages).

Anna K Liljedahl et al., "Pan-arctic ice-wedge degradation in warming permafrost and its influence on tundra hydrology", Nature Geoscience, 2016, vol. 9, No. 4, pp. 312-318 (8 pages).

Hongwei Liu et al., "Integrated approach for the masw dispersion analysis using the spectral element technique and trust region reflective method", Computers and Geotechnics, 2020, vol. 125, 103689, pp. 1-11 (11 pages).

Hongwei Liu et al., "Optimum insulation design for buried utilities subject to frost action in cold regions using the nelder-mead algorithm", International Journal of Heat and Mass Transfer, 2019, vol. 130, pp. 613-639 (27 pages).

Hongwei Liu et al., "Laboratory-scale characterization of saturated soil samples through ultrasonic techniques", Scientific reports, 2020, vol. 10, No. 1, pp. 1-17 (17 pages).

Zhiming Li et al., "Pulsed nmr measurements of unfrozen water content in partially frozen soil", Journal of Cold Regions Engineering, 2020, vol. 34, No. 3, pp. 04020013-1-10 (10 pages).

J Ross Mackay, "The world of underground ice", Annals of the Association of American Geographers, 2020, vol. 62, No. 1, pp. 1-22 (23 pages).

L. Marescot et al., "Assessing reliability of 2d resistivity imaging in mountain permafrost studies using the depth of investigation index method", Near Surface Geophysics, 2023, vol. 1, No. 2, pp. 57-67 (11 pages).

Radoslaw L. Michalowski et al., "Frost heave modelling using porosity rate function", International journal for numerical and analytical methods in geomechanics, 2006, vol. 30, No. 8, pp. 703-722 (22 pages).

Jeffrey S. Munroe et al., "Application of Ground-Penetrating Radar Imagery for Three-Dimensional Visualisation of Near-Surface Structures in Ice-Rich Permafrost, Barrow, Alaska", Permafrost and Periglacial Processes, 2007, vol. 18, No. 4, pp. 309-321 (13 pages).

Pier P. Overduin et al., "Submarine permafrost depth from ambient seismic noise", Geophysical Research Letters, 2015, vol. 42, No. 18, pp. 7581-7588 (8 pages).

Trevor J. Porter et al., "Recent advances in paleoclimatological studies of arctic wedge-and pore-ice stable-water isotope records", Permafrost and Periglacial Processes, 2020, vol. 31, pp. 429-441 (13 pages).

Malcolm Sambridge, "Geophysical inversion with a neighborhood algorithm searching a parameter space", Geophysical journal international, 1999, vol. 138, No. 2, pp. 479-494 (16 pages).

Cristian Scapozza et al., "Internal structure and permafrost distribution in two alpine periglacial talus slopes, Valais, Swiss Alps", Geomorphology, 2011, vol. 132, No. 3-4, pp. 208-221 (14 pages).

Edward AG Schuur et al., "Climate change and the permafrost carbon feedback", Nature, Apr. 9, 2015, vol. 520, No. 7546, pp. 171-179 (9 pages).

Tiziana Vanorio et al., "Elastic properties of dry clay mineral aggregates, suspensions and sandstones", Geophysical Journal International, 2003, vol. 155, No. 1, pp. 319-326 (8 pages).

Florian M. Wagner et al., "Quantitative imaging of water, ice and air in permafrost systems through petrophysical joint inversion of seismic refraction and electrical resistivity data", Geophysical Journal International, 2019, vol. 219, No. 3, pp. 1866-1875 (10 pages).

Chandi Witharana et al., "Understanding the synergies of deep learning and data fusion of multispectral and panchromatic high resolution commercial satellite imagery for automated ice-wedge polygon detection", ISPRS Journal of Photogrammetry and Remote Sensing, 2020, vol. 170, pp. 174-191 (18 pages).

Yanhui You et al., "Application of electrical resistivity tomography in investigating depth of permafrost base and permafrost structure in tibetan plateau", Cold Regions Science and Technology, vol. 87, pp. 19-26 (8 pages).

Mingyi Zhang et al., "Variations of the temperatures and volumetric unfrozen water contents of fine-grained soils during a freezing-thawing process", Acta Geotechnica, 2020, vol. 15, No. 3, pp. 595-601 (7 pages).

Weixing Zhang et al., "Deep convolutional neural networks for automated characterization of arctic ice-wedge polygons in very high spatial resolution aerial imagery", Remote Sensing, 2018, vol. 10, No. 9, 1487, pp. 1-31 (31 pages).

S.M. Ali Zomorodian et al., "Inversion of SASW dispersion curves based on maximum flexibility coefficients in the wave number

(56)         References Cited

OTHER PUBLICATIONS domain", Soil Dynamics and Earthquake Engineering, 2006, vol. 26, No. 8, pp. 735-752 (18 pages).

\* cited by examiner

10

SYSTEMS AND METHODS FOR IN-SITU CHARACTERIZATION OF PERMAFROST SITES

FIELD

Aspects of this disclosure relate to the characterization of permafrost.

BACKGROUND

The adverse effects of climate change and global warming on the built environment are indisputable, undeniable and accelerating at an alarming pace. According to Canada's Changing Climate Report (2019), in the Arctic regions, temperatures have been warming at approximately twice the rate of the rest of the world. This drastic trend in climate warming will no doubt affect permafrost temperatures and conditions, continued growth in greenhouse gas emissions, and further adding to the high cost of northern development. Planning and designing climate-resilient northern infrastructure as well as projecting associated reductions in permafrost thickness from climate model simulations requires an estimation of permafrost properties. Important properties include the current thickness of active layer, porosity, saturation degree of water, saturation degree of ice, soil type, as well as mechanical properties such as shear modulus and bulk modulus.

Permafrost is defined as the ground that remains at or below 0° C. for at least two consecutive years. The upper layer of the ground in permafrost areas, termed as the active layer, seasonally thaws and freezes. The thickness of the active layer greatly depends on the local geological and climate conditions such as vegetation, soil composition, air temperature, solar radiation, and wind speed.

Within the permafrost, the distribution of the ground ice is highly variable. Also, ground ice can be present under distinctive forms including (1) pore ice, (2) segregated ice, and (3) ice-wedge [7, 22]. Pore water, which fills or partially fills the pore space of the soil, freezes in place if the temperature drops below the freezing point [27]. On the other hand, segregated ice is formed when water migrates to the freezing front and it can cause excessive deformations in frost-susceptible soils. Frost-susceptible soils, e.g. silty or silty clay soils, have relatively high capillary potential and moderate relative and intrinsic permeability. The ice wedge is referred to large masses of ice formed in thermal contraction cracks. During the winter months, the ice expands as the ground freezes to form cracks in the subsurface [18]. Ice wedges are large masses of ice formed over many centuries by repeated frost cracking and ice vein growth.

Design and construction of engineering works on permafrost normally follow one of two broad principles which are based on whether the frozen foundation soil is thaw-stable or thaw-unstable (ice-rich permafrost). This distinction is determined by the amount of ice content within the permafrost. Ice-rich permafrost contains ice in excess of the water content at saturation. The construction on thaw-unstable permafrost is challenging and requires remedial measures since upon thawing, permafrost will experience significant thaw-settlement and suffer loss of strength to a value significantly lower than that for similar material in an unfrozen condition. Consequently, remedial measures for excessive soil settlements or new design of infrastructure in permafrost zones affected by climate warming require a reasonable estimation of the amount of ice content within the permafrost (frozen soil). The rate of settlement relies also on the mechanical properties of the foundation permafrost at the construction site. Furthermore, a warming climate can accelerate the microbial breakdown of organic carbon stored in permafrost and can increase the release of greenhouse gas emissions, which in return would accelerate climate change [30].

Several in-situ techniques have been employed to characterize or monitor permafrost conditions. For example, techniques such as remote sensing [34, 1, 37], and ground penetrating radar (GPR) [25, 6, 33] have been used to detect ice-wedge formations within the permafrost layers. Also, electrical resistivity tomography (ERT) has been extensively used to qualitatively detect pore-ice or segregated ice in permafrost based on the correlation between the electrical conductivity and the physical properties of permafrost (e.g., unfrozen water content and ice content) [9, 10, 29, 35]. The apparent resistivity measurement by ERT is higher in areas having high ice contents [35]; however, at high resistivity gradients, the inversion results become less reliable, especially for the investigation of permafrost base [12, 23]. Furthermore, in ERT investigations, the differentiation between ice and certain geomaterials can be highly uncertain due to their similar electrical resistivity properties [15]. GPR has been also used for mapping the thickness of the active layer; however, its application is limited to a shallow penetration depth in conductive layers due to the signal attenuation and high electromagnetic noise in ice and water [15]. It is worth mentioning that none of the above-mentioned methods characterizes the mechanical properties of permafrost layers.

Non-destructive seismic testing, including multi-channel analysis surface waves (MASW) test [8, 9], passive seismic test with ambient seismic noise [14, 26], seismic reflection [2], and seismic refraction method have been previously employed to map the permafrost layer based on the measurement of the shear wave velocity. In the current seismic testing practice, it is commonly considered that the permafrost layer (frozen soil) is associated with a higher shear wave velocity due to the presence of ice in comparison to unfrozen ground. However, the porosity and soil type can also significantly affect the shear wave velocity [20]. In other words, a relatively higher shear wave velocity could be associated to an unfrozen soil layer with a relatively lower porosity or stiffer solid skeletal frame, and not necessarily related to the presence of a frozen soil layer. Therefore, the detection of permafrost layer and permafrost base from only the shear wave velocity may lead to inaccurate and even misleading interpretations.

SUMMARY

In one example, a method of quantifying a plurality of parameters of a subsurface structure comprising a region of interest, the method comprising the steps of:
- with at least one vibratory source, emitting an input wave signal into the subsurface structure to cause generation of seismic wave signals in the subsurface structure;
- with at least one receiver, acquiring and measuring the seismic wave signals from the subsurface structure, wherein surface wave signals comprise at least one first Rayleigh wave (R1) signal and at least one second Rayleigh wave (R2) signal associated with the region of interest;
- generating, at a data processing apparatus, seismic data associated with measurements of the seismic wave signals;

determining, at the data processing apparatus, from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest; and wherein the method is non-invasive.

In another example, a system for quantifying a plurality of parameters of a subsurface structure comprising a region of interest, the system comprising:

at least one vibratory source to emit an input wave signal into the subsurface structure to cause generation of seismic wave signals in the subsurface structure;

at least one receiver to acquiring and measure surface wave signals from the subsurface structure, wherein the surface wave signals comprise at least one first Rayleigh wave (R1) signal and at least one second Rayleigh wave (R2) signal associated with the region of interest;

a data processing apparatus comprising a processor, a non-transitory computer-readable medium storing instructions which, when executed, cause the processor to perform operations comprising to at least:

generate seismic data associated with measurements of the seismic wave signals;

determine from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest.

In another example, a computer-readable medium storing instructions which, when executed by a processor, cause a computing device to perform operations comprising:

with at least one vibratory source, emitting an input wave signal into the subsurface structure to cause generation of seismic wave signals in the subsurface structure;

acquiring seismic wave signals from a subsurface structure, wherein surface wave signals comprise at least one first Rayleigh wave (R1) signal and at least one second Rayleigh wave (R2) signal associated with the region of interest;

converting the seismic wave signals into seismic data;

determining from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest.

Advantageously, an in-situ seismic surface wave technique estimates the physical and mechanical properties of permafrost sites, based on the existence of two Rayleigh waves, that is, a first Rayleigh wave (R1) signal which is dependent on at least one of the plurality of parameters of the region of interest, and a second Rayleigh wave (R2) signal. Generally, the R2 wave is highly sensitive to the physical properties (e.g., unfrozen water content, ice content, and porosity) of permafrost while it is relatively insensitive to the mechanical properties (e.g., shear modulus and bulk modulus). On the other hand, the R1 wave velocity depends strongly on the mechanical properties of foundation permafrost. The in-situ surface wave measurements revealed the experimental dispersion relations of both types of Rayleigh waves from which relevant properties of a permafrost site can be derived by means of a hybrid inverse and multi-phase poromechanical approach.

The identification of two distinctive types of Rayleigh waves in the seismic measurement at permafrost sites is useful in characterizing permafrost. The identification of the R2 wave also allows the quantitative characterization of permafrost properties (e.g., unfrozen water content, ice content, and porosity) independently without making any assumptions on the mechanical properties of the permafrost. This significantly reduces the difficulties in the inversion of the multi-layered three-phase poromechanical model since the dependent optimization variables are largely reduced. The inversion results from the R2 wave dispersion relation can be further used in the characterization of the mechanical properties of permafrost based on the R1 wave. This also increases the stability and convergence rate of the inversion model.

Accordingly, the physical properties of the permafrost, such as the amount of unfrozen water content, ice content, and porosity as well as the mechanical properties such as the shear modulus and bulk modulus of permafrost layers, may be quantified. In addition, the location of the permafrost table and permafrost base may also be determined.

DETAILED DESCRIPTION

Figure 1:
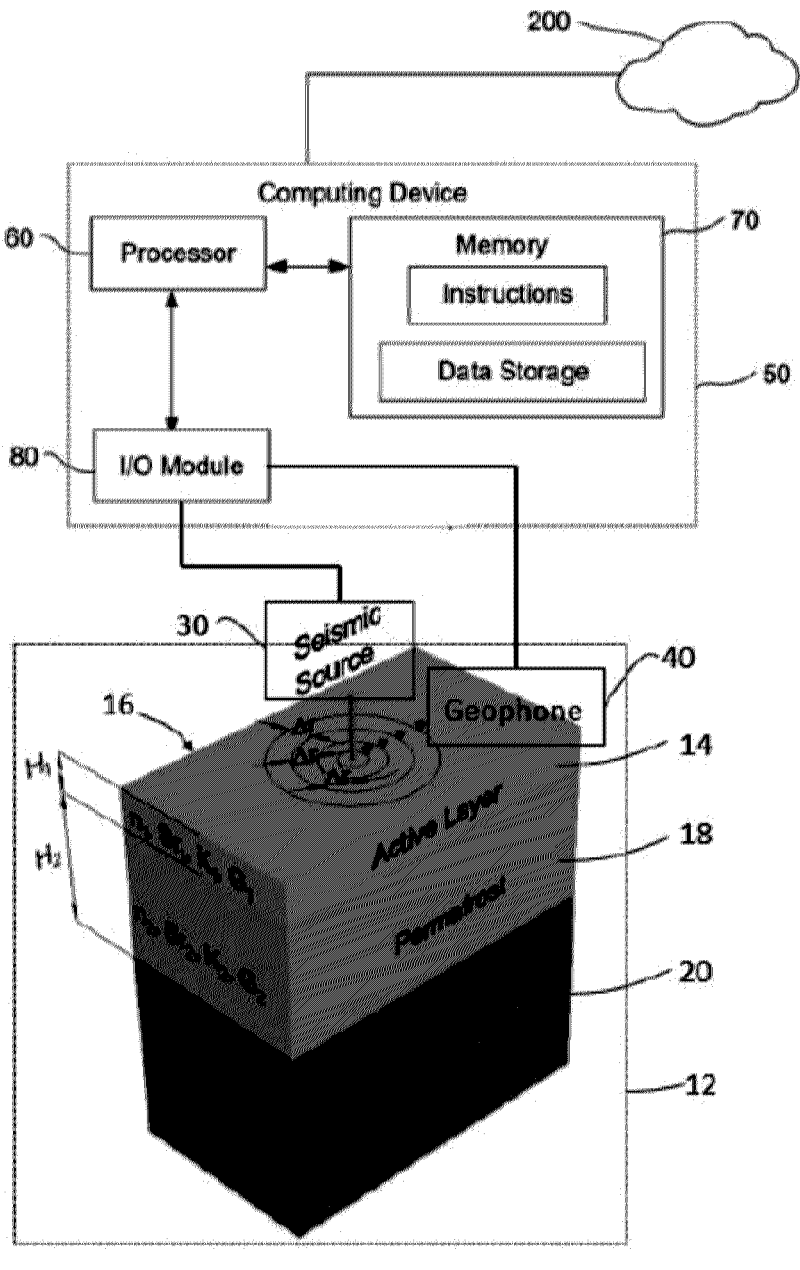
FIG. 1 shows a high level architecture block diagram of a system for quantifying the characteristics of a subsurface structure.

FIG. 1 shows a system for determining characteristics of a subsurface structure, general designated by numeral 10, in one implementation. Subsurface structure 12 comprises active layer 14 with surface 16, permafrost layer 18 and unfrozen ground 20. Seismic source 30 may be selectively and periodically actuated to impart energy in the form of an acoustic or pressure wave through subsurface structure 12 and to generate seismic waves within subsurface structure 12. In one example, seismic source 30 may be ambient noise or an object impacting surface 16, or other means. Various types of controlled seismic sources may be used. Seismic detector 40 is preferably secured in essentially fixed relation to subsurface structure 12. In one example, seismic detector 30 is a geophone which measures the vertical particle velocity induced by seismic waves in subsurface structure 12. Seismic source 30 may be in electrical communication with computing device 50 to control the actuation of seismic source 30, and seismic detector 40 is in electrical communication with computing device 50 for transmission of detected seismic signals thereto.

Seismic detectors 40 may be arranged in a line, or in an array, or positioned in specific distances (radius) from a center (with an equally spaced radius Δr, but an arbitrary angle θ) for performing a seismic survey operation with respect to a subsurface structure 12. The subsurface structure 12 may have at least one subsurface region of interest, such as permafrost layer 18.

Computing device 50 comprises processor 60, memory 70 for storing data associated with the seismic signals received from seismic detectors 40, and for storing computer readable instructions executable by processor 60 to at least, via input/output module 80 and receive the detected seismic signals from seismic detectors 40, and determine the characteristics of a region of interest of subsurface structure 12. Accordingly, through analysis of these detected seismic signals, the characteristics of permafrost layer 18, such as the amount of ice content, unfrozen water content, and porosity, as well as the shear modulus and bulk modulus of permafrost layers 18, including the location of the permafrost table and permafrost base, may be determined.

Figure 2A:
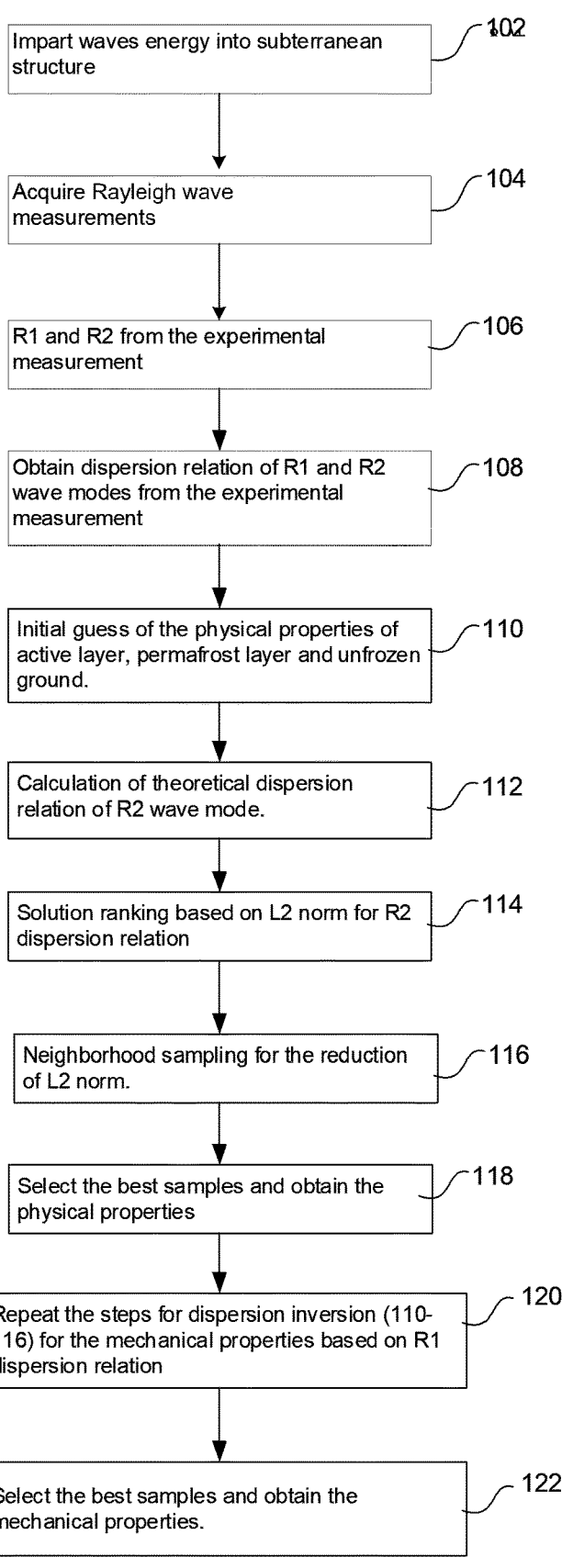
FIG. 2a shows a flow diagram of a method for determining the characteristics of a region of interest of a subsurface structure.
Figure 2B:
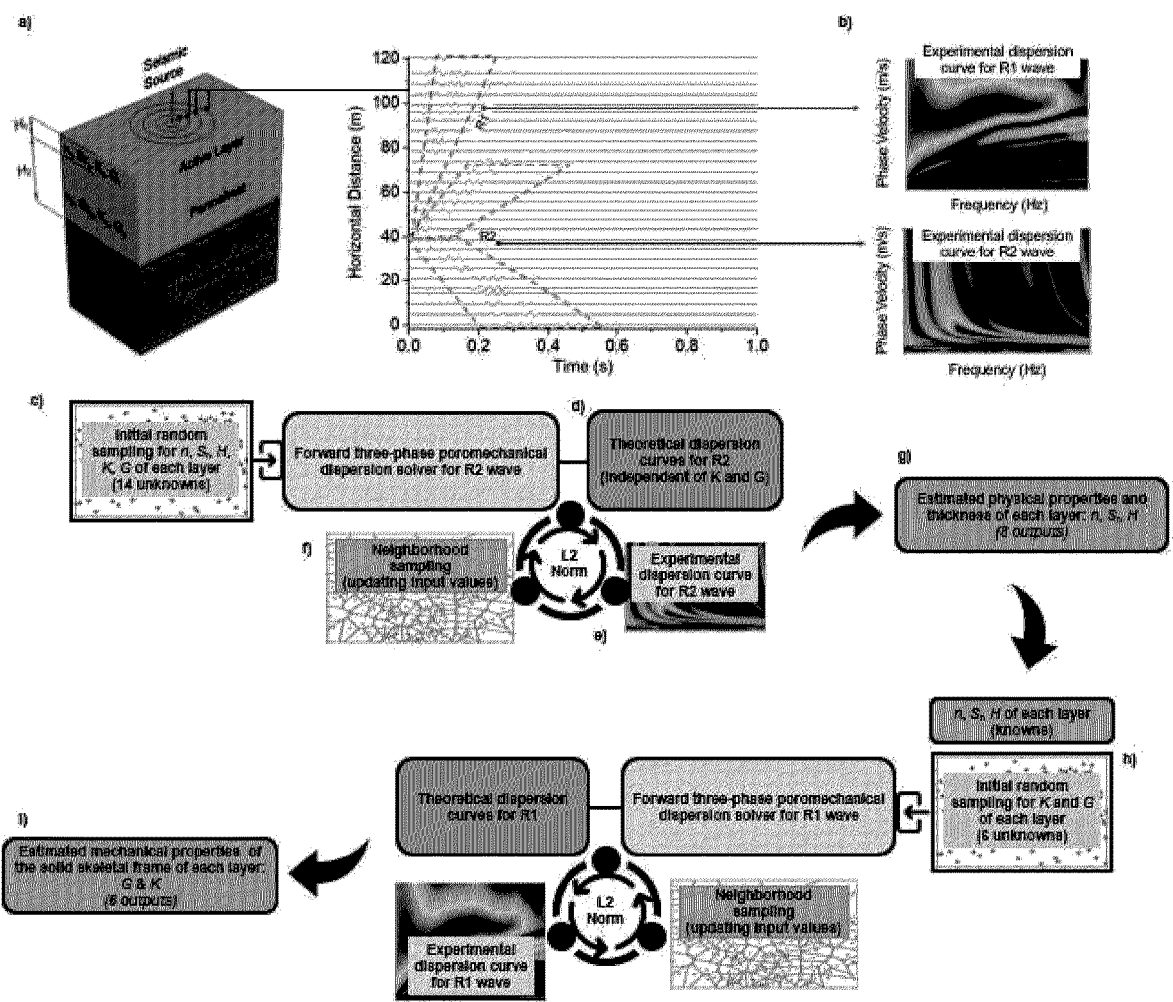
FIG. 2b shows a general schematic of a multi-channel analysis surface waves (MASW) testing method.

FIG. 2a shows flow diagram 100 depicting a computer-implemented method for determining the characteristics of a region of interest of subsurface structure 12 by processing seismic data in accordance with various implementations described herein, and FIG. 2b shows a general schematic of a method for determining the characteristics of a region of interest of subsurface structure 12 by processing seismic data from a multi-channel analysis surface waves (MASW) testing method. It should be understood that while the operational flow diagram indicates a particular order of execution of the operations, in other implementations, the operations might be executed in a different order. Further, in some implementations, additional operations or blocks may be added to the method. Likewise, some operations or blocks may be omitted.

Looking at FIG. 2a, at block 102, seismic source 30 is actuated source to selectively and/or periodically impart energy in the form of an acoustic or pressure wave through subsurface structure 12. For example, the imparted energy may comprise a known amplitude, frequency and duration.

At block 104, geophone 40 acquires seismic signals from subsurface structure 12, including signals for a region of interest (i.e., "the received seismic data"). The region of interest may include an area of the subsurface in the earth that may be of particular interest, such as permafrost layer 18. Surface wave measurements are then derived from the acquired seismic signals.

At block 106, computing device 50 generates an initial model to obtain a dispersion relation for the R1 and R2 wave modes.

At block 108, computing device 50 receives the acquired signals from geophones 40, uses the surface wave measurements and computes a dispersion relation of R1 and R2 wave modes. The dispersion of R2 waves is then used to characterize the physical properties (e.g., unfrozen water content, ice content, and porosity) of permafrost layer 18 of subsurface structure 12.

At block 110, an initial estimate of the physical properties of active layer 16, permafrost layer 18 and unfrozen ground 20 is postulated.

At block 112, a forward three-phase poromechnical dispersion prediction model is used to compute the theoretical dispersion relation of the R2 mode. The dispersion relation prediction model offers theoretical dispersion relation functions for propagation of stress waves.

At block 114, samples within a parameter space of the poromechanical dispersion prediction model are ranked based on the L2 norm between the experimental and theoretical dispersion relations between the R1 wave and the R2 wave.

At block 116, a Neighborhood sampling for the reduction of L2 norm is performed.

At block 118, the best samples with the minimum loss function are selected to obtain the most likely physical properties of active layer 16, permafrost layer 18, and unfrozen ground 20.

At block 120, the steps 110-116 for dispersion inversion for the mechanical properties based on the R1 dispersion relation are repeated.

At block 122, the best samples are selected and the mechanical properties are obtained. The mechanical properties can be derived based on the dispersion relation of the R1 wave mode in a similar manner.

Looking back at step 108, in one implementation surface wave measurements are employed to obtain a dispersion relation of R1 and R2 wave modes from the experimental measurement. A frozen soil from subsurface structure 12 may be composed of three phases: solid skeletal frame, pore-water, and pore-ice, and the Green-Lagrange strain tensor ($\epsilon_{ij}$) for infinitesimal deformations expressed as displacement vector $$u_i^1, u_i^2 \text{ and } u_i^3$$

for solid skeleton, pore water and pore ice may be expressed as:

$$
\begin{cases}
\epsilon_{i,j}^1 & = \dfrac{1}{2}\left(u_{i,j}^1 + u_{j,i}^1\right) \\[2mm]
\epsilon_{i,j}^2 & = \dfrac{1}{3}\epsilon_{kk}^2 \delta_{ij} \; \left(\epsilon_{kk}^2 = u_{k,k}^2\right) \\[2mm]
\epsilon_{i,j}^3 & = \dfrac{1}{2}\left(u_{i,j}^3 + u_{j,i}^3\right)
\end{cases}
\tag{D.1}
$$

where $\delta_{ij}$ is the identity tensor.

The constitutive models may be defined as the relation between the stress and strain tensors for solid skeleton, pore water and pore ice may be expressed as:

$$
\begin{cases}
\sigma_{ij}^1 & = (K_1\theta_1 + C_{12}\theta_2 + C_{13}\theta_3)\delta_{ij} + 2\mu_1 d_{ij}^1 + \mu_{13} d_{ij}^3 \\[1mm]
\sigma^2 & = C_{12}\theta_1 + K_2\theta_2 + C_{23}\theta_3 \\[1mm]
\sigma_{ij}^3 & = (K_3\theta_3 + C_{23}\theta_2 + C_{13}\theta_1)\delta_{ij} + 2\mu_3 d_{ij}^3 + \mu_{13} d_{ij}^1
\end{cases}
\tag{D.2}
$$

in which $\sigma^1$, $\sigma^2$, $\sigma^3$ are the effective stress, pore water pressure and ice pressure, respectively. The definition of each term (e.g., $K_1$, $C_{12}$, $C_{13}$, $\mu_1$, $\mu_{13}$, $K_2$, $C_{23}$, $K_3$, $\mu_3$) in Equation D.2 is given in Appendix E. The term $$\theta_m, d_{ij}^m \text{ and } \varepsilon_{ij}^m$$

(m, ranging from 1 to 3, represents the different phases) are defined as follows:

$$
\begin{cases}
\theta_m & = \epsilon_{kk}^m \\[2mm]
d_{ij}^m & = \epsilon_{ij}^m - \dfrac{1}{3}\delta_{ij}\theta_m \\[2mm]
\epsilon_{ij}^m & = \dfrac{1}{2}\left(u_{i,j}^m + u_{ij,i,j}^m\right)
\end{cases}
$$

The momentum conservation considers the acceleration of each component and the existing relative motion of the pore ice and pore water phases with respect to the solid skeleton. The momentum conservation for the three phases is given by Equation D.3.

$$
\begin{cases}
\sigma_{ij,j}^1 & = p_{11}\ddot{u}_i^1 + p_{12}\ddot{u}_i^2 + p_{13}\ddot{u}_i^3 - b_{12}\left(\dot{u}_i^2 - \dot{u}_i^1\right) - b_{13}\left(\dot{u}_i^3 - \dot{u}_i^1\right) \\[1mm]
\sigma_{,j}^2 & = p_{12}\ddot{u}_i^1 + p_{22}\ddot{u}_i^2 + p_{23}\ddot{u}_i^3 - b_{12}\left(\dot{u}_i^2 - \dot{u}_i^1\right) - b_{23}\left(\dot{u}_i^2 - \dot{u}_i^3\right) \\[1mm]
\sigma_{ij,j}^3 & = p_{13}\ddot{u}_i^1 + p_{23}\ddot{u}_i^2 + p_{33}\ddot{u}_i^3 - b_{23}\left(\dot{u}_i^2 - \dot{u}_i^1\right) - b_{13}\left(\dot{u}_i^3 - \dot{u}_i^1\right)
\end{cases}
\tag{D.3}
$$

in which the expressions for the density terms ($\rho_{ij}$ or $\bar{\rho}$ in matrix form) and viscous matrix ($b_{ij}$ or $\bar{b}$ in matrix form) are given in Appendix E; $\ddot{u}_i$ and $\dot{u}_i$ represent second and first derivative of displacement vectors with respect to time; the subscript i represents the component in r, $\theta$ and z direction in cylindrical coordinates.

Through the infinitesimal kinematic assumption (Equation D.1), the stress-strain constitutive model [3] (Equation D.2), and the conversation of momentum (Equation D.3), the field equation can be written in the matrix form $$
\bar{\rho}\begin{bmatrix} \ddot{u}_i^1 \\ \ddot{u}_i^2 \\ \ddot{u}_i^3 \end{bmatrix} + \bar{b}\begin{bmatrix} \dot{u}_i^1 \\ \dot{u}_i^2 \\ \dot{u}_i^3 \end{bmatrix} = \bar{R}\nabla\nabla\cdot\begin{bmatrix} \ddot{u}_i^1 \\ \ddot{u}_i^2 \\ \ddot{u}_i^3 \end{bmatrix} - \bar{\mu}\,\nabla\times\nabla\times\begin{bmatrix} \ddot{u}_i^1 \\ \ddot{u}_i^2 \\ \ddot{u}_i^3 \end{bmatrix}
\tag{D.4}
$$

in which the matrix $\bar{R}$ and $\bar{\mu}$ are given in Appendix E.

The matrix $\bar{\rho}$, $\bar{b}$, $\bar{R}$ and $\bar{\mu}$ are given in Appendix E. The field equations can also be written in the frequency domain by performing convolution with $e i\omega t$. The field equations in the Laplace domain are obtained by replacing $\omega$ with i·s ($i^2 = -1$ and s the Laplace variable).

To obtain the analytical solution, the Helmholtz decomposition is used to decouple the P waves (P1, P2, and P3) and S waves (S1 and S2). The displacement vector ($\bar{u}_i$) is composed of the P wave scalar potentials q and S wave vector potentials $\bar{\psi}=(\psi_r, \psi_\theta, \psi_z)$. Since P waves exist in the solid skeleton, pore-ice and pore-water phases, three P wave potentials are used, including $\varphi_s$, $\varphi_i$ and $\varphi_f$ may be expressed as follows:

$$
\begin{cases}
\bar{u}^1 = \nabla\phi_1 + \nabla\times\bar{\psi}_1 \text{ and } \nabla\cdot\bar{\psi}_1 = 0 \\[1mm]
\bar{u}^2 = \nabla\phi_2 + \nabla\times\bar{\psi}_2 \text{ and } \nabla\cdot\bar{\psi}_2 = 0 \\[1mm]
\bar{u}^3 = \nabla\phi_3 + \nabla\times\bar{\psi}_3 \text{ and } \nabla\cdot\bar{\psi}_3 = 0
\end{cases}
\tag{D.6}
$$

Figure 8:
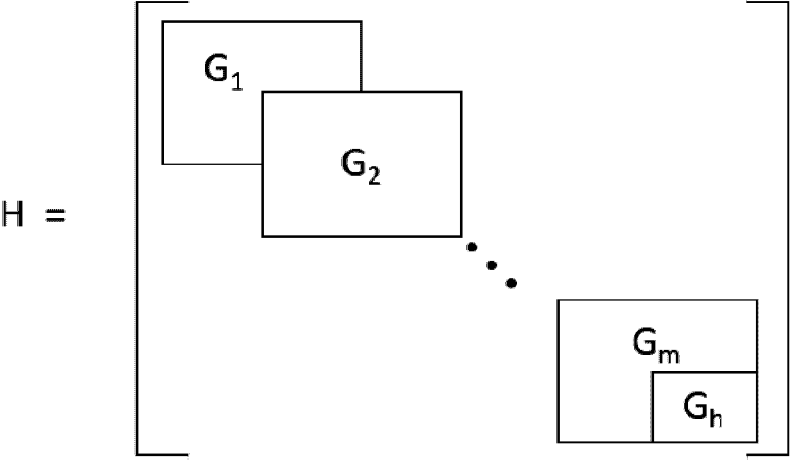
FIG. 8 shows a stiffness assembling method, in which the global stiffness is denoted as H matrix for simplicity.

The detailed steps for obtaining the analytical solutions for P waves and S waves using the Eigen decomposition are summarized in Appendix D. After obtaining the stiffness matrix for each layer, the global stiffness matrix can be obtained by applying the continuity conditions between layer interfaces. The stiffness assembling method is shown in FIG. 8. The global stiffness is denoted as H matrix for simplicity.

The dispersion relation is obtained by setting a zero stress condition at the surface (z=0). To obtain the non-trivial solution, the determinant of the global stiffness matrix has to be zero, as expressed in Equation 1 [38].

$$\det H(\omega, k) = 0. \tag{1}$$

The global stiffness matrix, H($\omega$, k), is a function of angular frequency $\omega$ and wavenumber k. For a constant frequency, the value of the wavenumber can be determined when the determinant of the global stiffness matrix is zero. The dispersion curve is also commonly displayed as frequency versus phase velocity, $$v = \frac{\omega}{k}.$$

The different wavenumbers determined at a given frequency correspond to dispersion curves of different modes. To extract the fundamental mode of the R1 wave, the velocities of P1 wave and S1 wave are calculated first for the given physical properties and mechanical properties of each layer. The global stiffness matrix for the R1 wave can be decomposed into the components related only to the P1 and S1 wave velocities. This is viable since we have proved that the R1 wave is generated by the interaction between the P1 and S1 waves. This approach avoids the difficulties in differentiating the higher modes of R2 wave from the fundamental mode of the R1 wave. The detailed root search method has been documented in [18].

Next, inversion is performed. The aim function is defined as the Euclidean norm between the experimental and numerical dispersion relations. The problem is formulated in Equation 2:

$$\begin{cases} \text{minimize } f(x) = \frac{1}{2} \sum_{i=1}^{N} (y_i - \overline{y}_i(x))^2 \\ \text{subject to } a_i \leq x_i \leq b_i, i = 1, \dots, m \end{cases} \quad (2)$$

where f is the objective function; $x=(x_1, x_2, \dots x_m)$ is the optimization variable (e.g., porosity, and degree of saturation of unfrozen water, degree of saturation of ice, bulk modulus and shear modulus of solid skeleton frame as well as thickness of each layer); the constant $a_i$ and $b_i$ are limits or bounds for each variable; m is the total number of variables; y and $\overline{y}$ are the numerical and experimental dispersion relations for the R1 or R2 waves.

Here, we used the neighborhood algorithm that benefits from the Voronoi cells to search the high-dimensional parameter space and reduce overall cost function [28]. The algorithm contains only two tuning parameters. The neighborhood sampling algorithm includes the following steps: a random sample is initially generated to ensure the soil parameters are not affected by the local minima. Based on the ranking of each sample, the Voronoi polygons are used to generate better samples with a smaller objective function. The optimization parameters are scaled between 0 and 1 to properly evaluate the Voronoi polygon limit, which is calculated as shown in paragraph below. The detailed description of the neighborhood algorithm is described by [28].

$$x_i = \frac{1}{2}\left(v_{k,i} + v_{j,i} + \frac{d_k^2 - d_j^2}{v_{k,i} - v_{j,i}}\right); i = 1, n \quad (3)$$

where i represents the dimension index; $v_k$ is the starting point (sample) calculated as $i/n_r$ where $n_r$ is the resample number in the neighbourhood algorithm; n is the number of dimension; $v_j$ is the normalized samples excluding the $v_k$; the $d_k$ and $d_j$ are evaluated as:

$$d_k = \sum_1^n \left(\sqrt{v_{ki} - y_i} - \sqrt{v_{ki+1} - y_{i+1}}\right) \quad (4)$$

$$d_j = \sum_1^n \left(\sqrt{v_{ji} - y_i} - \sqrt{v_{ji+1} - y_{i+1}}\right)$$

where $y_i$ is the new sample generated through Voronoi polygons by assuming a uniform distribution. The new sample needs to be generated within better bounds ($l_b$ and $u_b$), which is calculated as:

$$l_b = \text{Max}(0, \text{Max}(x_i[x_i \leq v_{ki}])) \quad (5)$$

$$u_b = \text{Min}(1, \text{Min}(x_i[x_i \geq v_{ki}])).$$

After generating a new sample, the distance calculation needs to be updated. The aim function may be reduced through a plurality iterations of these processes.

Figure 3A:
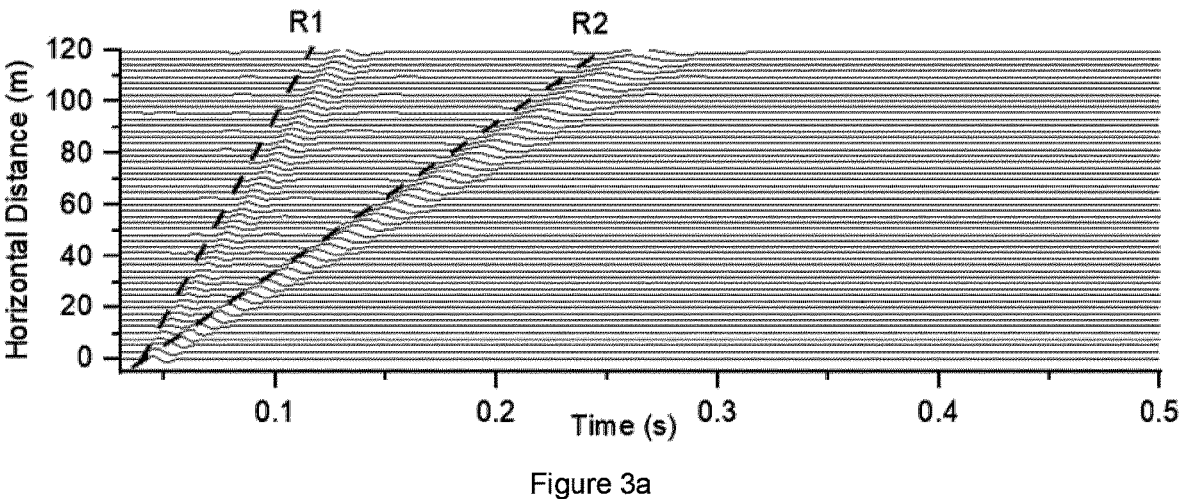
FIG. 3a shows theoretical time-series measurements for R1 and R2 Rayleigh waves at a ground surface.
Figure 3B:
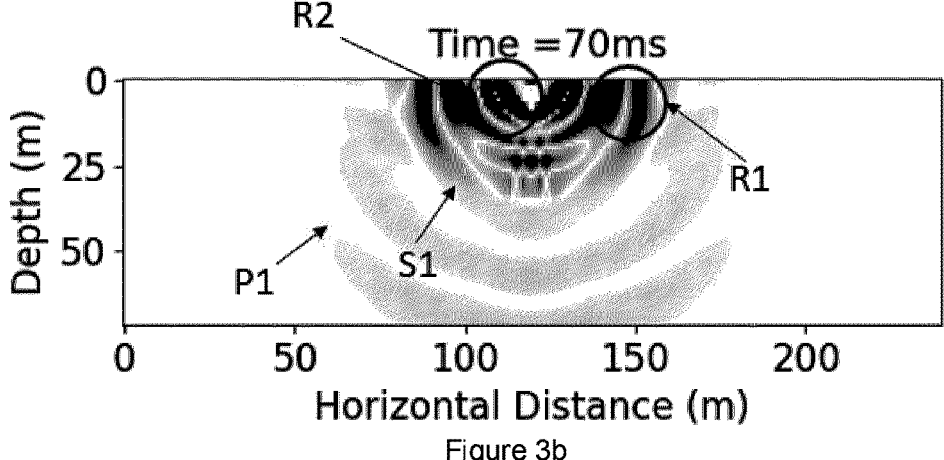
FIG. 3b shows a displacement contour at time 70 ms.
Figure 3C:
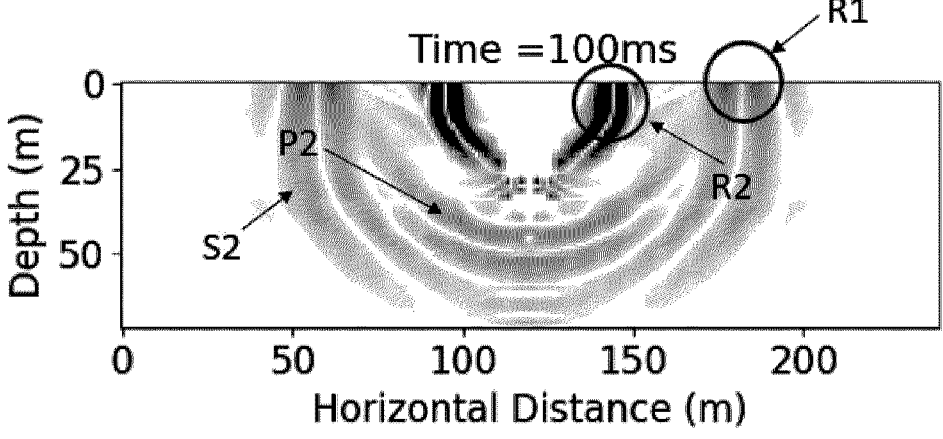
FIG. 3c shows a displacement contour at time 100 ms.

The results of an experimental study will now be described. From a poromechanical point of view, permafrost (frozen soil) is a multi-phase porous medium that is composed of a solid skeletal frame and pores filled with water and ice with different proportions. Here, we analyze the seismic wave propagation in permafrost based on the three-phase poroelastodynamic theory. Three types of P wave (P1, P2 and P3) and two types of S wave (S1, S2) coexist in three-phase frozen porous media [3, 5, 4]. The P1 and S1 waves are strongly related to the longitudinal and transverse waves propagating in the solid skeletal frame, respectively, but are also dependent on the interactions with pore ice and pore water [5]. The P2 and S2 waves propagate mainly within pore ice [16]. Similarly, the P3 wave is due to the interaction between the pore water and the solid skeletal frame. The velocity of different types of P waves and S waves is provided in Appendix A. Here a uniform frozen soil layer is used to show the propagation of different types of P and S waves and subsequently the formation of Rayleigh waves (R1 and R2) at the surface. It is assumed that an impulse load with a dominant frequency of 100 Hz is applied at the ground surface. The wave propagation analysis was performed in clayey soils by assuming a porosity (n) of 0.5, a degree of saturation of unfrozen water (Sr) of 50%, a bulk modulus (K) of 20.9 GPa and a shear modulus (G) of 6.85 GPa for the solid skeletal frame [11]. The velocities of the P1 and P2 waves are calculated as 2,628 m/s and 910 m/s, respectively, based on the relations given in Appendix A. The velocity of P3 wave (16 m/s) is relatively insignificant in comparison to P1 and P2 wave velocities. Similarly, the velocities of the S1 and S2 waves are calculated as 1,217 m/s and 481 m/s, respectively. Accordingly, the observed displacements measured at the ground surface with an offset from the impulse load ranging from 0 to 120 m are illustrated in FIG. 3a. FIGS. 3b and 3c illustrate the appearance of two types of Rayleigh waves (R1 and R2) in a three-phase permafrost subsurface at 70 ms and 100 ms, respectively. The S1 animation given in Appendix B shows the propagation of P, S, and R waves in the domain. Our results convincingly demonstrate that R1 waves appear due to the interaction of P1 and S1 waves. The phase velocity of R1 waves is slightly slower than the phase velocity of S1 waves. Similarly, the phase velocity of R2 waves is also slightly slower than the phase velocity of S2 waves. Briefly, the order of phase velocities of different waves propagating within the domain is as follows: P1>P2>S1>R1>S2>R2>P3. The seismic measurements shown in FIG. 3a are indeed a combination of both R1 and R2 waves.

Figure 3D:
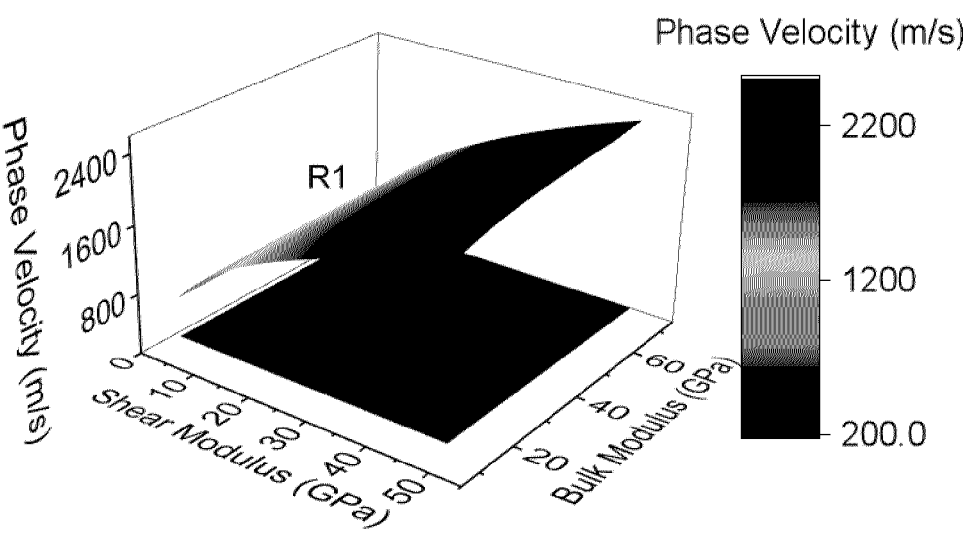
FIG. 3d shows an effect of shear modulus and bulk modulus of the soil skeletal frame on R1 and R2 waves.
Figure 3E:
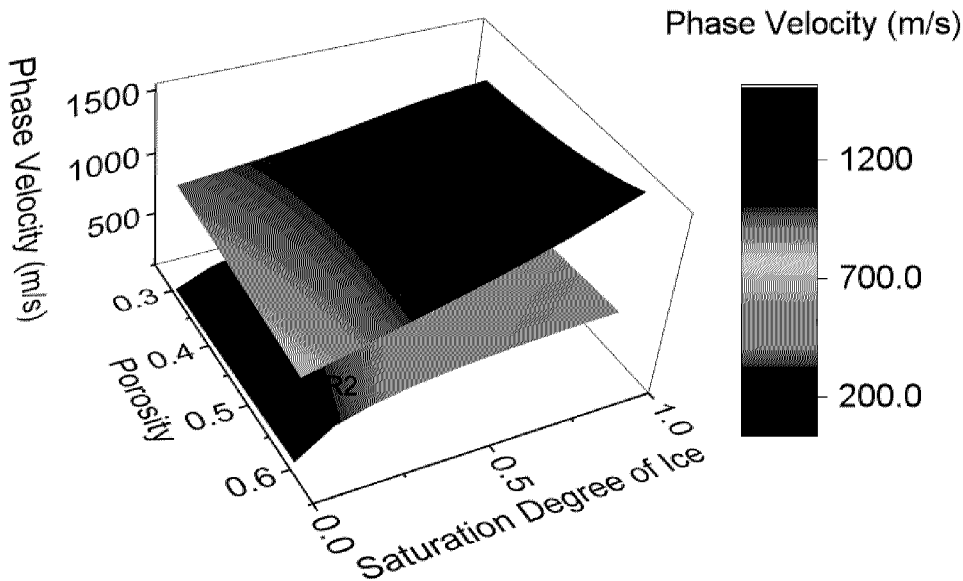
FIG. 3e shows an effect of degree of saturation of ice on the phase velocity of R1 and R2 waves.

The phase velocities of R1 and R2 waves are a function of physical properties (e.g., degree of saturation of unfrozen water, degree of saturation of ice, and porosity) and mechanical properties of the solid skeletal frame (e.g., bulk modulus and shear modulus). FIG. 3d illustrates the effect of shear modulus and bulk modulus of the solid skeletal frame on the phase velocity of R1 and R2 waves. Similarly, FIG. 3e illustrates the effect of porosity and degree of saturation of ice on the phase velocity of R1 and R2 waves. It can be seen that the phase velocity of the R1 wave is mostly sensitive to the shear modulus of the solid skeletal frame; it is also dependent on the bulk modulus, porosity, and degree of saturation of ice. On the other hand, the phase velocity of the R2 wave is almost independent of the mechanical properties of the solid skeletal frame (FIG. 3d), while it is strongly affected by the porosity and degree of saturation of ice (FIG. 3e). Our results also show that an increase in the degree of saturation of ice leads to an increase in the phase velocity of both types of Rayleigh waves. An increase in porosity leads to an increase in the phase velocity of R2. However, an increase in porosity may lead to either a decrease or an increase in the phase velocity of R1 wave, depending on the level of the degree of saturation of ice. Hence, we use the phase velocity of R2 waves identified by processing the seismic surface wave measurements to characterize the physical properties (e.g., porosity, degree of saturation of ice or degree of saturation of unfrozen water) of permafrost or soil layers.

Figure 4A:
FIG. 4a shows the study area in Holocene, Fuglebekken, SW Spitsbergen in section 1 (from 0 m to 120 m)
Figure 4B:
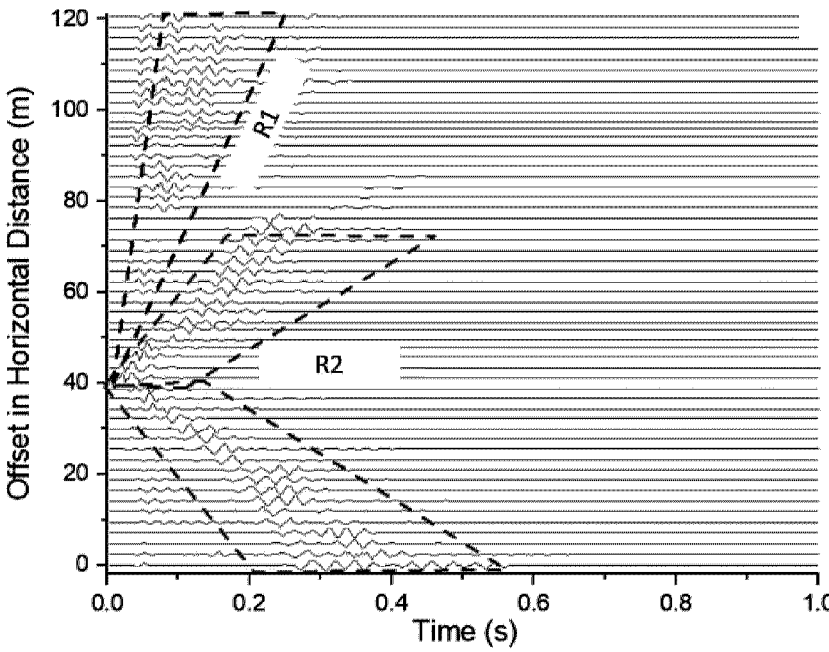
FIG. 4b shows waveform data from the measurements at different offsets in horizontal distance.
Figure 4C:
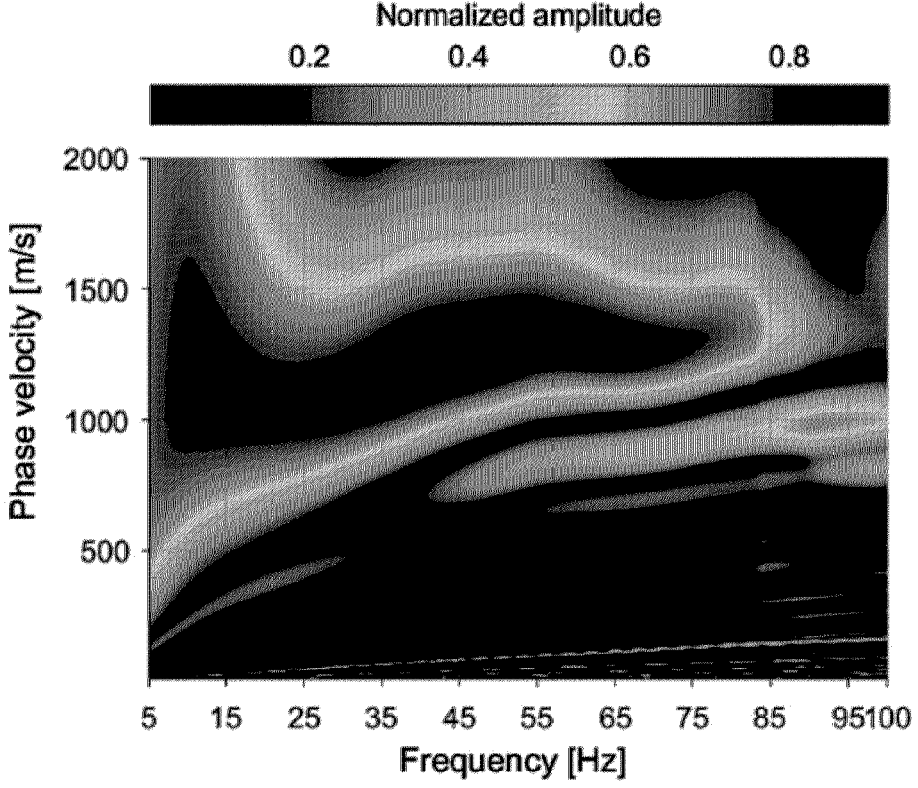
FIG. 4c shows an experimental dispersion image for R1 wave.
Figure 4D:
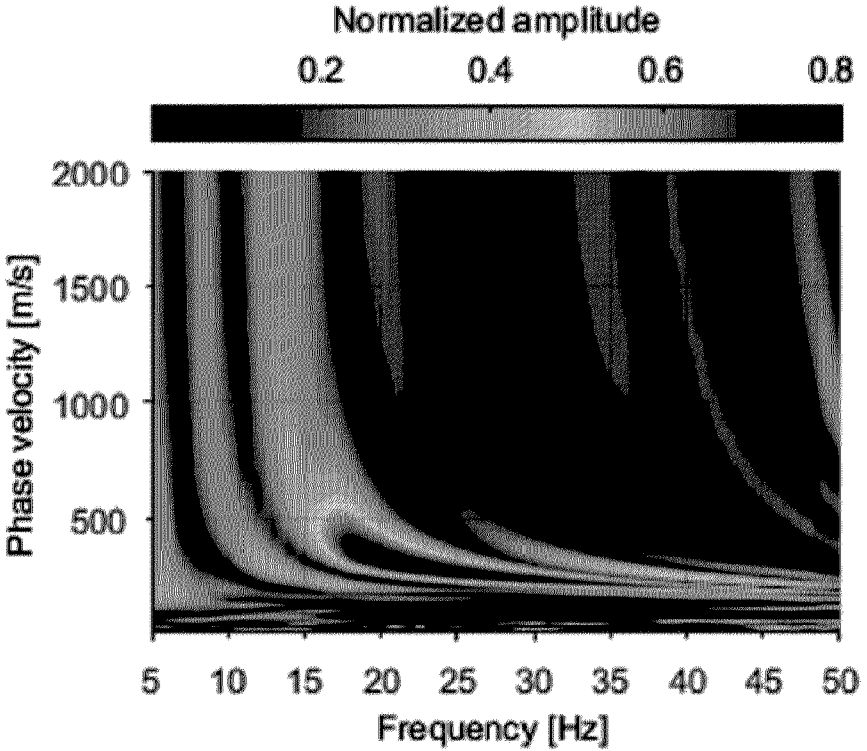
FIG. 4d shows an experimental dispersion image for R2 wave.

In one example, a case study site is located at the Fuglebekken coastal area in SW Spitsbergen, Norway (77°00'30" N and 15°32'00" E). The study area has a thick layer of unconsolidated sediments that is suitable for near-surface geophysical investigations [9]. The unconsolidated sedimentary rock contains a high proportion of pore spaces; consequently, the pores spaces can accumulate a large volume of pore-water or pore-ice. From meteorological records, the mean annual air temperature (MAAT) at the testing site was historically below the freezing point, but more recently and due to a trend of climate warming, the MAAT recorded in 2016 is approaching 0° C. [9]. [9] performed both seismic surveys (MASW test) and electrical resistivity investigations at the site in October 2017 to study the evolution and formation of permafrost considering surface watercourses and marine terrace. The MASW test was performed by using the geophone receivers 40 distributed at 2 m spacing. FIG. 4a shows the test site. FIG. 4b illustrates the collected original seismic measurements at distances between 0 m and 120 m (hereafter referred to Section 1). The R1 and R2 Rayleigh waves are identified by visual inspection to obtain the experimental dispersion relations (FIGS. 4c and 4d). The phase velocity of R1 wave increases with frequency from 15 Hz to 75 Hz. The phase velocity of R2 wave decreases with frequency in the span of 17.5 Hz to 40 Hz.

In the simulations, the permafrost site is considered as a three-layered system, including active layer 16, permafrost layer 18, and unfrozen ground 20. The ERT results reported by Glazer et al. [9] proved that active layer 16 is almost unfrozen during the MASW testing performed in October. The degree of saturation of unfrozen water is considered above 85% for the active layer in our study. The temperature of the permafrost layer remains below or at 0° C. year round, but the volumetric ice content of the test site is unknown. Therefore, in our simulation, the degree of saturation of unfrozen water in the permafrost layer is considered to be between 1% and 85% to be conservative. The unfrozen ground is believed to have a degree of saturation of unfrozen water of about 100% (fully saturated). The porosity of all three layers is distributed between 0.1 and 0.7. We previously showed that the dispersion relation of the R2 wave is strongly dependent on the physical properties (e.g., porosity and degree of saturation of unfrozen water). Hence, the R2 dispersion relation (FIG. 4d) is used first to determine the most probable distributions of porosity and degree of saturation of unfrozen water with depth. The other physical properties such as degree of saturation of ice, volumetric water content and volumetric ice content can also be obtained by knowing porosity and degree of saturation of unfrozen water. The mechanical properties of the solid skeletal frame in each layer are then obtained using the R1 wave dispersion relation. The mechanical properties can be then used to determine whether the permafrost site is ice-rich. In fact, the direct detection of the thin ice lenses using low frequency seismic waves is highly impossible due to the mismatch between the thickness of the ice segregation layers and the wavelength generated in seismic tests. However, the mechanical properties of permafrost reveal the mineral composition of the soil and soil type, which is valuable in the classification of ice-rich permafrost or even detection of whether the permafrost layer is prone to greenhouse gases carbon dioxide and methane emission to the atmosphere.

Figure 5A:
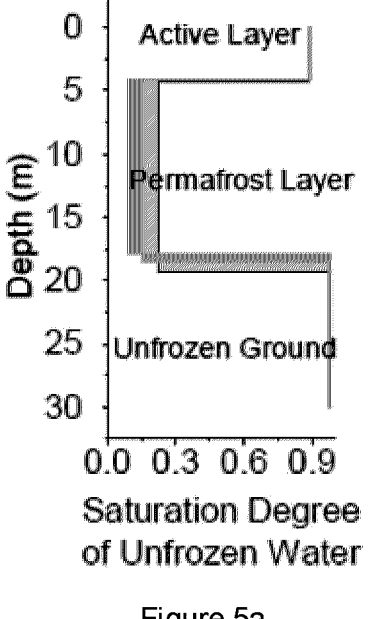
FIG. 5a shows the degree of saturation of unfrozen water in Section 1 (from 0 m to 120 m)
Figure 5B:
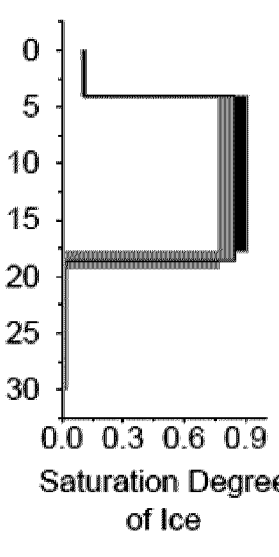
FIG. 5b shows the degree of saturation of ice distribution in each layer.
Figure 5C:
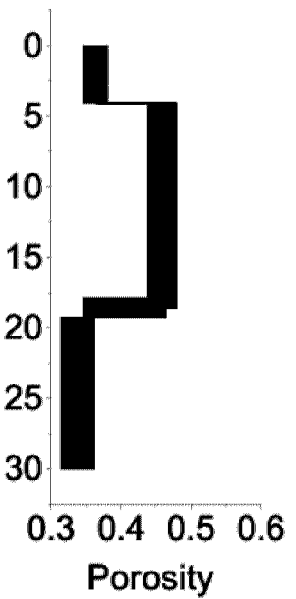
FIG. 5c shows the porosity distribution in each layer.
Figure 5D:
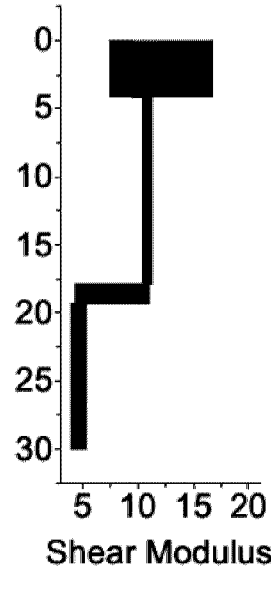
FIG. 5d shows the shear modulus of a solid skeletal frame in each layer.
Figure 5E:
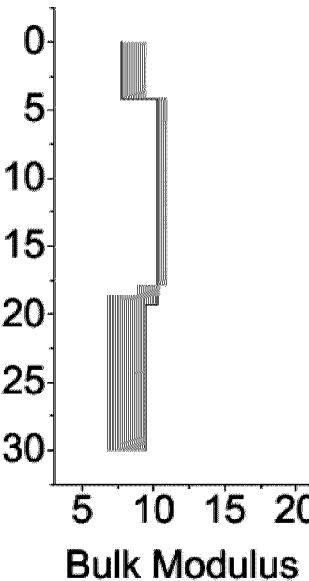
FIG. 5e shows the bulk modulus of a solid skeletal frame in each layer.
Figure 5F:
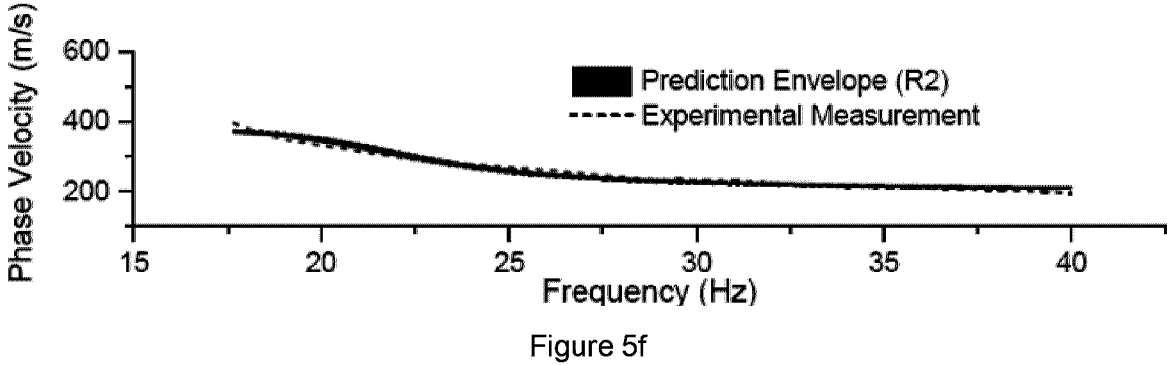
FIG. 5f shows a comparison between the experimental and numerical dispersion curves for a R2 wave.
Figure 5G:
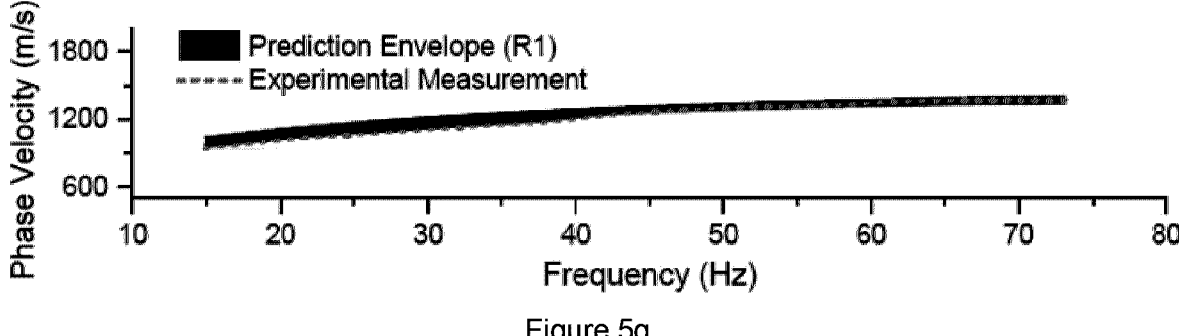
FIG. 5g shows a comparison between the experimental and numerical dispersion curves for a R1 wave.

FIG. 5a shows the probabilistic distribution of the degree of saturation of unfrozen water with depth in Station 1. Our results show that the active layer has a thickness of about 4.1 m with a degree of saturation of unfrozen water of 88%. The ground temperature can be estimated given the unfrozen water content and porosity by an empirical relation described by [19]. This implies the average soil temperature in the active layer is about 0° C. The predicted permafrost layer has a thickness of about 13.6 m with a nearly 8.8%-22% of degree of saturation of unfrozen pore water. Given the high ice-to-water ratio, we therefore interpret the permafrost is currently in a stable frozen state. FIG. 5b shows the degree of saturation of ice with depth. The degree of saturation of ice in the permafrost layer ranges from 77% to 91%. FIG. 5c illustrates the porosity distribution with depth. The porosity ranges from 0.34 to 0.38 in the first layer (active layer), from 0.43 to 0.46 in the second layer (permafrost) and from 0.31 to 0.36 in the third layer (unfrozen ground). FIGS. 5d and 5e show the predicted mechanical properties of the solid skeletal frame (shear modulus and bulk modulus) in each layer. The predicted shear modulus and bulk modulus for the solid skeletal frame in the permafrost layer are about 11 GPa and 10 GPa, which are in the range for silty-clayey soils [31]. FIGS. 5f and 5g show the comparison between the numerical and experimental dispersion relations for R2 and R1 waves, respectively. The numerical predictions are sufficiently close to the experimental dispersion curves for both R1 and R2 waves.

Figure 6A:
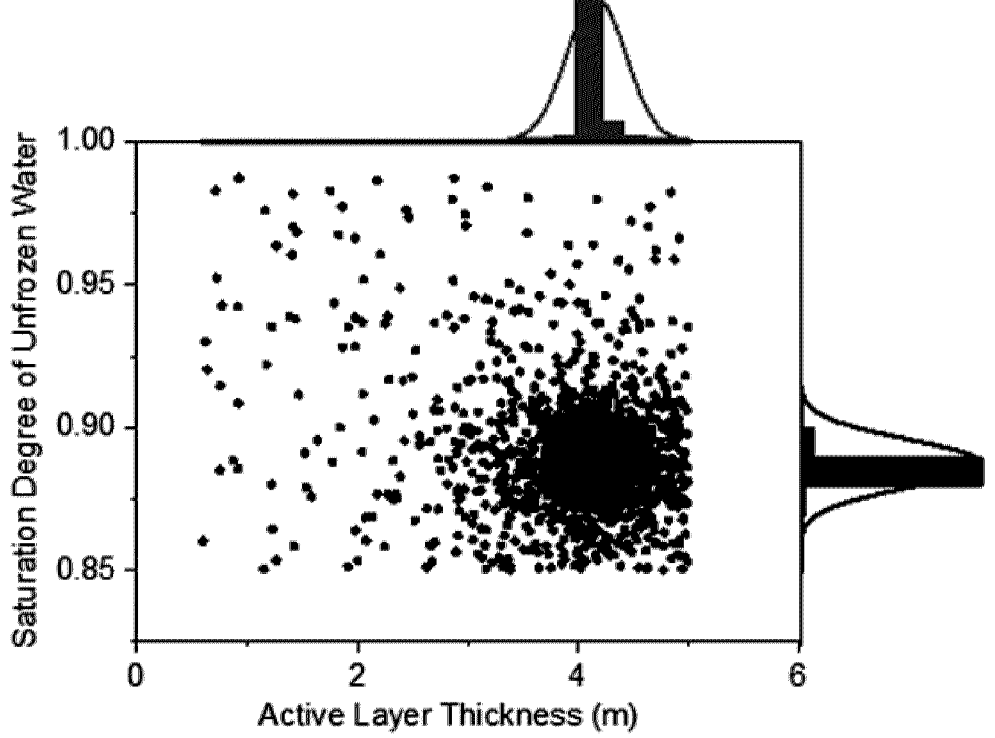
FIG. 6a shows a sampling subspace between sampling subspace between the degree of saturation of unfrozen water and the thickness of the active layer in an inversion process for the R2 wave dispersion relation.
Figure 6B:
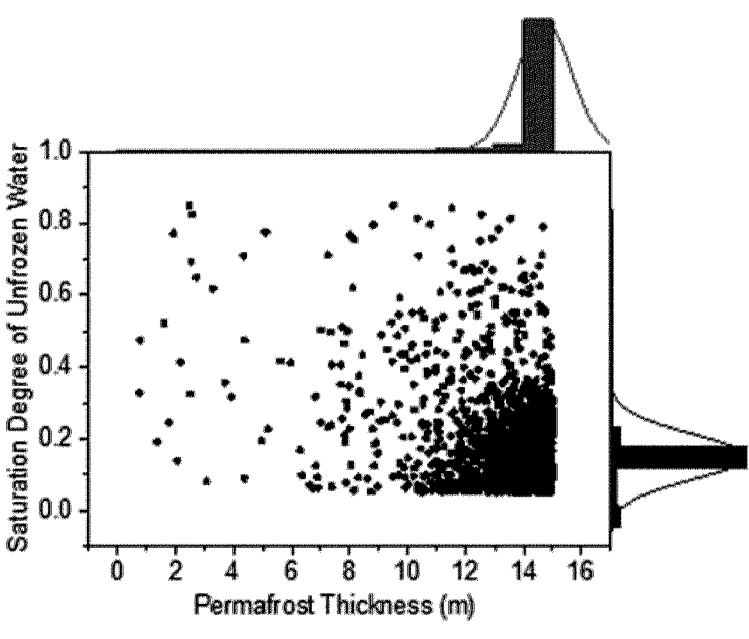
FIG. 6b shows a sampling subspace between the degree of saturation of unfrozen water and the thickness of the permafrost layer.
Figure 6C:
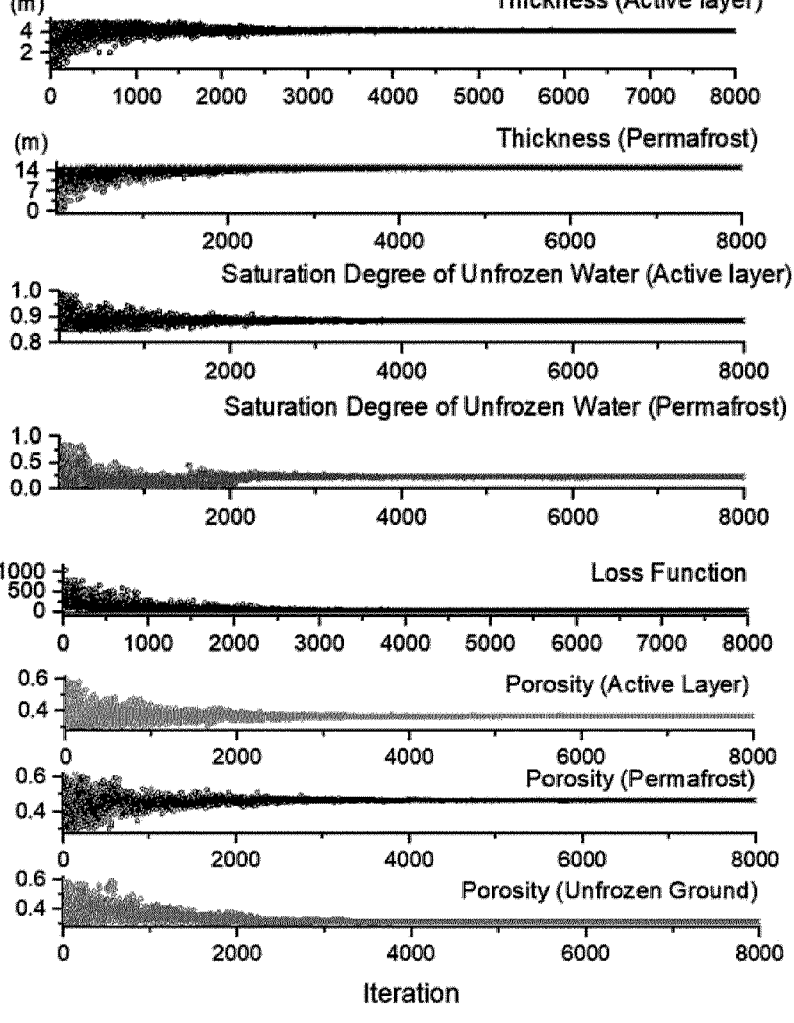
FIG. 6c shows updates of thicknesses of the active layer and permafrost layer, including the physical properties at each layer by means of a Neighborhood algorithm.

FIG. 6 illustrates the inversion process of the surface wave measurements for the R2 wave by means of the Neighborhood algorithm. Initially, 20 random samples were employed in the entire space (to avoid the local minimum problem). Voronoi decomposition is used to generate representative sampling points about the best samples in the previous steps. FIG. 6a shows the entire set of sampling points in the subspace between the degree of saturation of unfrozen water and the thickness of the active layer. Most sampling points are concentrated at the location where the degree of saturation of unfrozen water is 88% and the thickness of the active layer is 4.1 m. Similarly, in the subspace of the degree of saturation of unfrozen water and the thickness of the permafrost layer, our results showed that the permafrost layer is most likely having a thickness of 13.6 m with a degree of saturation of unfrozen water of 15%. FIG. 6c shows the updates of each parameter (thickness, degree of saturation of unfrozen water and porosity) with the number of run in our forward solver. Our results show that the Neighborhood algorithm fully explores the searching space of each parameter. FIG. 6c also illustrates that the solution converged after roughly 4,000 iterations and the loss function was reduced from 1000 to only 43 at the end.

Figure 7A:
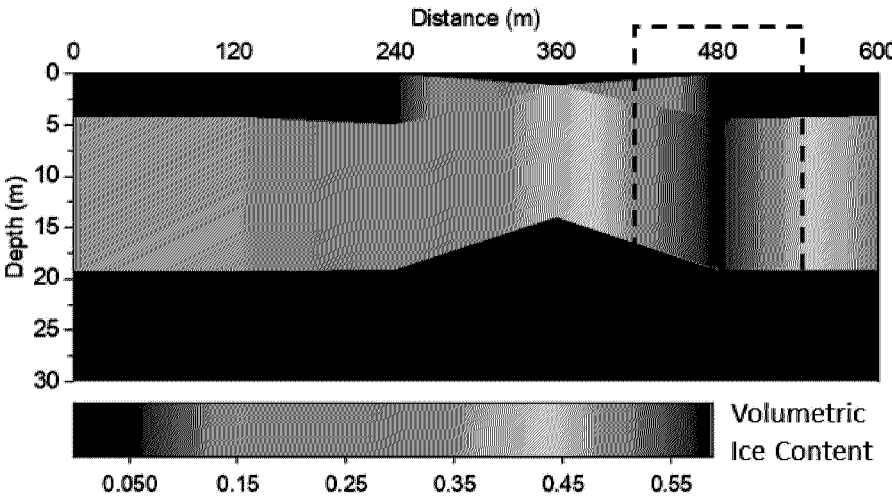
FIG. 7a shows a volumetric ice content distribution.
Figure 7B:
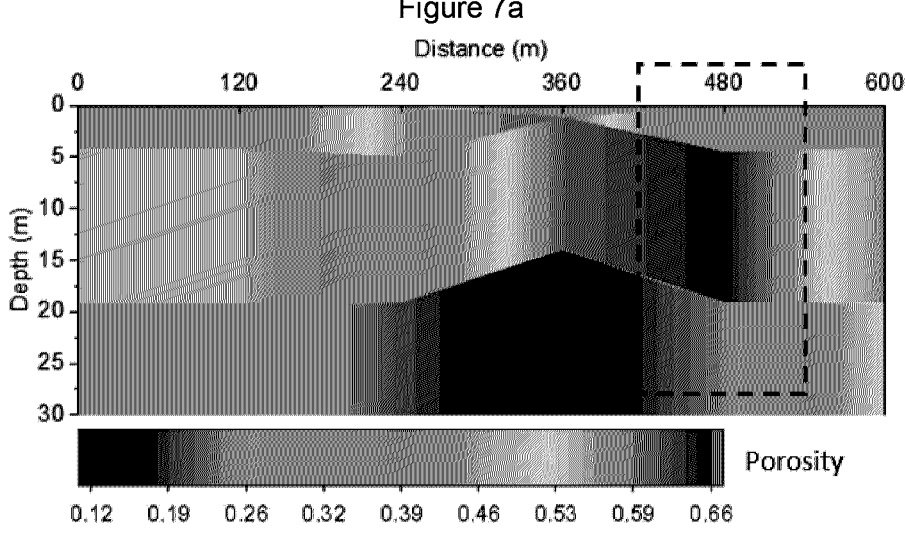
FIG. 7b shows a soil porosity distribution.
Figure 7C:
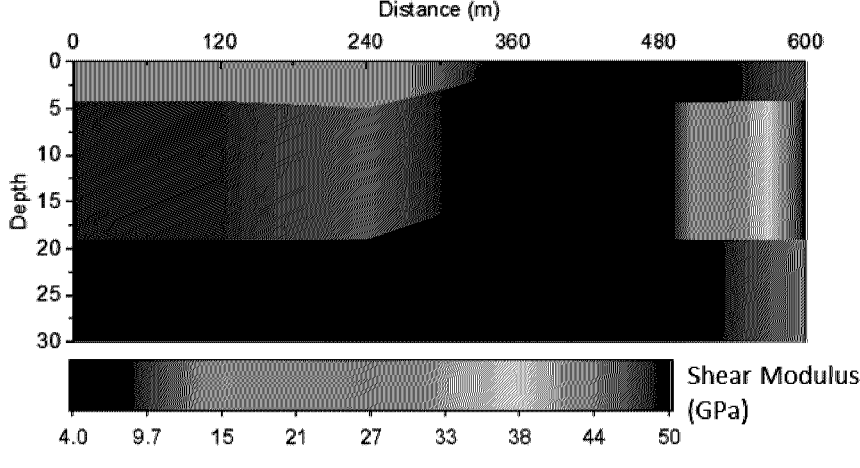
FIG. 7c shows a distribution of shear modulus of the solid skeletal frame.
Figures 7D, 7E:
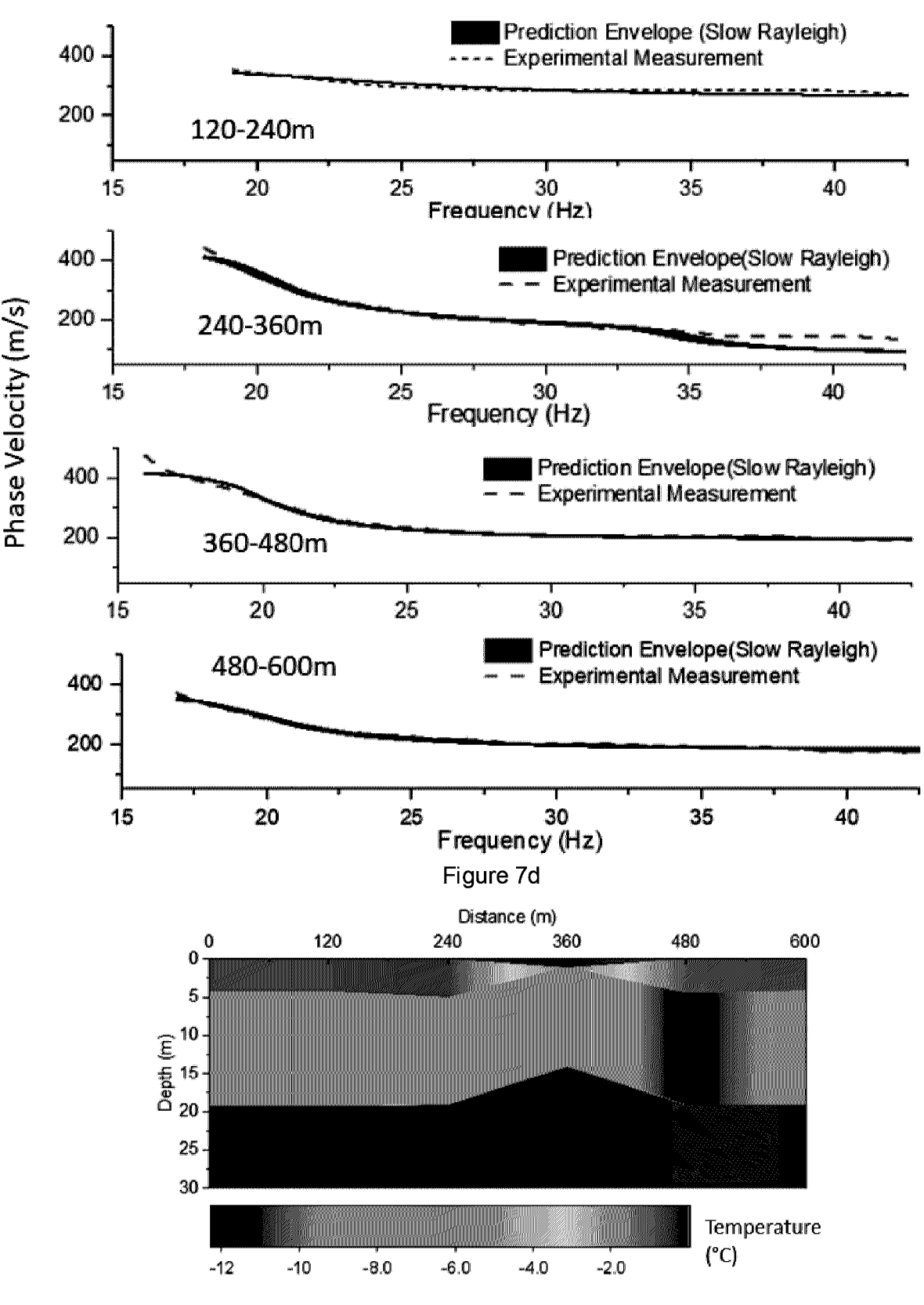
FIG. 7d shows a comparison between the numerical and experimental dispersion curves for R2 wave.
FIG. 7e shows a predicted soil temperature distribution.

We have previously shown the inversion process and results for Section 1 from 0 m to 120 m. Five additional sections spanning from 120 m to 600 m were also studied using a similar approach. The seismic measurements and dispersion relations for each section are given in Figure C1-C4 in Appendix C. FIG. 7a shows the distribution of the degree of saturation of unfrozen water in the ground based on the five independent MASW tests. The result demonstrates that the permafrost table is generally located at about 4 m below the ground surface, except at the offset distance from 360 m to 480 m where the permafrost table is located at 1.1 m below the ground surface. The thickness of the permafrost layer varies from 12 m to 15 m. We predicted that at the offset distance from 360 m to 480 m, the degree of saturation of ice is the highest (about 85%). FIG. 7b illustrates the distribution of the predicted porosity in the test site. We also predicted a higher porosity of 0.66 at the offset distance from 360 m to 480 m. The volumetric unfrozen water content (calculated as the product of porosity and the degree of saturation of unfrozen water) in the permafrost layer is about 0.08. [21, 36] showed that the residual volumetric unfrozen water content for silty-clay, clay, medium sand, and fine sand is 0.12, 0.08, 0.06 and 0.03, respectively. These predictions fit well within the reasonable range of volumetric unfrozen water content for clay or clayey silt. Sufficient agreement exists between the numerical and experimental dispersion relations for the R2 wave (FIG. 7d) which confirms the acceptance of the predicted values for the volumetric ice content (calculated as the product of porosity and the degree of saturation of ice) and porosity. Similarly, we obtain the mechanical properties of the solid skeletal frame for each layer (FIG. 7c) based on the phase velocity of R1 waves. By an empirical relation between the unfrozen water content, porosity, and soil temperature [19], we compute the average ground temperature distribution in the test site. It is predicted that at the offset distance from 360 m to 480 m the coldest temperature of about −12° C. (FIG. 7e) occurs in the permafrost layer, which is highly related to the high ice content in this section.

Looking at FIG. 1, computing device 50 may be coupled network 200.

The described illustration is only one possible implementation of the described subject matter and is not intended to limit the disclosure to the single described implementation. Those of ordinary skill in the art will appreciate the fact that the described components can be connected, combined, and/or used in alternative ways, consistent with this disclosure.

The network 200 facilitates communication between the computing device 50 and other components, for example, components that obtain observed data for a location and transmit the observed data to the computing device 50. The network 200 can be a wireless or a wireline network, or a combination thereof. The network 200 can also be a memory pipe, a hardware connection, or any internal or external communication paths between the components.

The computing device 50 includes a computing system configured to perform the method as described herein. In some cases, the algorithm of the method can be implemented in an executable computing code, e.g., C/C++ executable codes. In some cases, the computing device 50 can include mobile or personal computers that have sufficient memory size to process seismic data.

The computing device 50 may comprise a computer that includes an input device, such as a keypad, keyboard, touch screen, microphone, speech recognition device, other devices that can accept user information, and/or an output device that conveys information associated with the operation of the computing device 50, including digital data, visual and/or audio information, or a GUI.

The computing device 50 can serve as a client, network component, a server, a database, or other persistency, and/or any other component of the system 10. In some implementations, one or more components of the computing device 50 may be configured to operate within a cloud-computing-based environment or a distributed computing environment.

At a high level, the computing device 50 is an electronic computing device operable to receive, transmit, process, store, or manage data and information associated with the system 10. According to some implementations, the computing device 50 may also include, or be communicably coupled with, an application server, e-mail server, web server, caching server, streaming data server, business intelligence (BI) server, and/or other server.

The computing device 50 can receive requests over network 200 from a client application (e.g., executing on another computing device 50) and respond to the received requests by processing said requests in an appropriate software application. In addition, requests may also be sent to the computing device 50 from internal users (e.g., from a command console or by another appropriate access method), external or third parties, other automated applications, as well as any other appropriate entities, individuals, systems, or computers.

Computing device 50 includes an interface used according to particular needs, desires, or particular implementations of the computing device 50 and/or system 10. The interface is used by computing device 50 for communicating with other systems in a distributed environment, including within the system 10, connected to the network 200 (whether illustrated or not). Generally, the interface comprises logic encoded in software and/or hardware in a suitable combination and operable to communicate with the network 200. More specifically, the interface may comprise software supporting one or more communication protocols associated with communications such that the network 200 or interface's hardware is operable to communicate physical signals within and outside of the illustrated system 10.

Although single processor 60 is illustrated in FIG. 1, two or more processors may be used according to particular needs, desires, or particular implementations of the computing device 50 and/or the system 10. Generally, processor 60 executes instructions and manipulates data to perform the operations of the computing device 50.

Memory 70 that holds data for computing device 50 and/or other components of the system 10. Although illustrated as a single memory 70 in FIG. 1, two or more memories may be used according to particular needs, desires, or particular implementations of the computing device 50 and/or the system 10. While memory 70 is illustrated as an integral component of the computing device 50, in alternative implementations, memory 70 can be external to the computing device 50 and/or the system 10.

An application in memory 70 comprises an algorithmic software engine providing functionality according to particular needs, desires, or particular implementations of the computing device 50 and/or the system 10, particularly with respect to functionality required for processing seismic data. In addition, although illustrated as integral to the computing device 50, in alternative implementations, the application can be external to the computing device 50 and/or the system 10.

There may be any number of computers associated with, or external to, the system 10 and communicating over network 200. Further, the terms "client," "user," and other appropriate terminology may be used interchangeably, as appropriate, without departing from the scope of this disclosure. Moreover, this disclosure contemplates that many users may use one computing device 50, or that one user may use multiple computing device 50.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, optical disks, or flash storage (e.g. SSD). However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, DVD-ROM disks and Blu-ray disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations, and free-space optical networks. The network may communicate with, for example, Internet Protocol (IP) packets, Frame Relay frames, Asynchronous Transfer Mode (ATM) cells, voice, video, data, and/or other suitable information between network addresses.

The computing system can include clients and servers and/or Internet-of-Things (IoT) devices running publisher/subscriber applications. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The benefits and advantages described above may relate to one embodiment or may relate to several embodiments. The embodiments are not limited to those that solve any or all of the stated problems or those that have any or all of the stated benefits and advantages. The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. For example, the steps recited in any of the method or process claims may be executed in any order and are not limited to the order presented. Thus, the preceding detailed description is presented for purposes of illustration only and not of limitation, and the scope of the invention is defined by the preceding description, and with respect to the attached claims.

REFERENCES

[1] Md Abul Ehsan Bhuiyan, Chandi Witharana, and Anna K Liljedahl. Use of very high spatial resolution commercial satellite imagery and deep learning to automatically map ice-wedge polygons across tundra vegetation types. Journal of Imaging, 6 (12): 137, 2020.

[2] Laura L Brothers, Bruce M Herman, Patrick E Hart, and Carolyn D Ruppel. Subsea ice-bearing permafrost on the us beaufort margin: 1. minimum seaward extent defined from multichannel seismic reflection data. Geochemistry, Geophysics, Geosystems, 17 (11): 4354-4365, 2016.

[3] José M Carcione, Boris Gurevich, and Fabio Cavallini. A generalized biot-gassmann model for the acoustic properties of shaley sandstones1. Geophysical Prospecting, 48 (3): 539-557, 2000.

[4] Jose M Carcione, Juan E Santos, Claudia L Ravazzoli, and Hans B Helle. Wave simulation in partially frozen porous media with fractal freezing conditions. Journal of Applied Physics, 94 (12): 7839-7847, 2003.

[5] José M Carcione and Géza Seriani. Wave simulation in frozen porous media. Journal of Computational Physics, 170 (2): 676-695, 2001.

[6] Hanne H Christiansen, Norikazu Matsuoka, and Tatsuya Watanabe. Progress in understanding the dynamics, internal structure and palaeoenvironmental potential of ice wedges and sand wedges. Permafrost and Periglacial Processes, 27 (4): 365-376, 2016.

[7] Nicole J Couture and Wayne H Pollard. A model for quantifying ground-ice volume, yukon coast, western arctic Canada. Permafrost and Periglacial Processes, 28 (3): 534-542, 2017.

[8] Shan Dou and Jonathan B Ajo-Franklin. Full-wavefield inversion of surface waves for mapping embedded low-velocity zones in permafrost. Geophysics, 79 (6): EN107-EN124, 2014.

[9] Michał Glazer, Wojciech Dobiński, Artur Marciniak, Mariusz Majdański, and Małgorzata Błaszczyk. Spatial distribution and controls of permafrost development in non-glacial arctic catchment over the holocene, fugle-bekken, sw spitsbergen. Geomorphology, page 107128, 2020.

[10] Christian Hauck. New concepts in geophysical surveying and data interpretation for permafrost terrain. Permafrost and Periglacial Processes, 24 (2): 131-137, 2013.

[11] M B Helgerud, J Dvorkin, A Nur, A Sakai, and T Collett. Elastic-wave velocity in marine sediments with gas hydrates: Effective medium modeling. Geophysical Research Letters, 26 (13): 2021-2024, 1999.

[12] Christin Hilbich, L Marescot, Christian Hauck, M H Loke, and R Mäusbacher. Applicability of electrical resistivity tomography monitoring to coarse blocky and ice-rich permafrost landforms. Permafrost and Periglacial Processes, 20 (3): 269-284, 2009.

[13] Roger A Horn and Charles R Johnson. Matrix analysis. Cambridge university press, 2012.

[14] Stephanie R James, Hunter Knox, Robert E Abbott, Mark P Panning, and Elizabeth Screaton. Insights into permafrost and seasonal active-layer dynamics from ambient seismic noise monitoring. Journal of Geophysical Research: Earth Surface, 124 (7): 1798-1816, 2019.

[15] Christof Kneisel, Christian Hauck, Richard Fortier, and Brian Moorman. Advances in geophysical methods for permafrost investigations. Permafrost and periglacial processes, 19 (2): 157-178, 2008.

[16] Ph Leclaire, Frédéric Cohen-Ténoudji, and Jaime Aguirre-Puente. Extension of biot theory of wave propagation to frozen porous media. The Journal of the Acoustical Society of America, 96 (6): 3753-3768, 1994.

[17] Anna K Liljedahl, Julia Boike, Ronald P Daanen, Alexander N Fedorov, Gerald V Frost, Guido Grosse, Larry D Hinzman, Yoshihiro Iijma, Janet C Jorgenson, Nadya Matveyeva, et al. Pan-arctic ice-wedge degradation in warming permafrost and its influence on tundra hydrology. Nature Geoscience, 9 (4): 312-318, 2016.

[18] Hongwei Liu, Pooneh Maghoul, Ahmed Shalaby, Ako Bahari, and Farid Moradi. Integrated approach for the masw dispersion analysis using the spectral element technique and trust region reflective method. Computers and Geotechnics, 125:103689, 2020.

[19] Hongwei Liu, Pooneh Maghoul, and Ahmed Shalaby. Optimum insulation design for buried utilities subject to frost action in cold regions using the nelder-mead algorithm. International Journal of Heat and Mass Transfer, 130:613-639, 2019.

[20] Hongwei Liu, Pooneh Maghoul, and Ahmed Shalaby. Laboratory-scale characterization of saturated soil samples through ultrasonic techniques. Scientific reports, 10 (1): 1-17, 2020.

[21] Zhiming Li, Jian Chen, and Mitsutaka Sugimoto. Pulsed nmr measurements of unfrozen water content in partially frozen soil. Journal of Cold Regions Engineering, 34 (3): 04020013, 2020.

[22] J Ross Mackay. The world of underground ice. Annals of the Association of American Geographers, 62 (1): 1-22, 1972.

[23] L Marescot, MH Loke, D Chapellier, R Delaloye, C Lambiel, and E Reynard. Assessing reliability of 2d resistivity imaging in mountain permafrost studies using the depth of investigation index method. Near Surface Geophysics, 1 (2): 57-67, 2003.

[24] Radoslaw L Michalowski and Ming Zhu. Frost heave modelling using porosity rate function. International journal for numerical and analytical methods in geomechanics, 30 (8): 703-722, 2006.

[25] Jeffrey S Munroe, Jim A Doolittle, Mikhail Z Kanevskiy, Kenneth M Hinkel, Frederick E Nelson, Benjamin M Jones, Yuri Shur, and John M Kimble. Application of ground-penetrating radar imagery for three-dimensional visualisation of near-surface structures in ice-rich permafrost, barrow, alaska. Permafrost and Periglacial Processes, 18 (4): 309-321, 2007.

[26] Pier P Overduin, Christian Haberland, Trond Ryberg, Fabian Kneier, Tim Jacobi, Mikhail N Grigoriev, and Matthias Ohrnberger. Submarine permafrost depth from ambient seismic noise. Geophysical Research Letters, 42 (18): 7581-7588, 2015.

[27] Trevor J Porter and Thomas Opel. Recent advances in paleoclimatological studies of arctic wedge- and pore-ice stable-water isotope records. Permafrost and Periglacial Processes, 2020.

[28] Malcolm Sambridge. Geophysical inversion with a neighborhood algorithm searching a parameter space. Geophysical journal international, 138 (2): 479-494, 1999.

[29] Cristian Scapozza, Christophe Lambiel, Ludovic Baron, Laurent Marescot, and Emmanuel Reynard. Internal structure and permafrost distribution in two alpine periglacial talus slopes, valais, swiss alps. Geomorphology, 132 (3-4): 208-221, 2011.

[30] Edward A G Schuur, A David McGuire, C Schädel, Guido Grosse, J W Harden, Daniel J Hayes, Gustaf Hugelius, Charles D Koven, Peter Kuhry, David M Lawrence, et al. Climate change and the permafrost carbon feedback. Nature, 520 (7546): 171-179, 2015.

[31] Tiziana Vanorio, Manika Prasad, and Amos Nur. Elastic properties of dry clay mineral aggregates, suspensions and sandstones. Geophysical Journal International, 155 (1): 319-326, 2003.

[32] Florian M Wagner, Coline Mollaret, Thomas Günther, Andreas Kemna, and C Hauck. Quantitative imaging of water, ice and air in permafrost systems through petro-physical joint inversion of seismic refraction and electrical resistivity data. Geophysical Journal International, 219 (3): 1866-1875, 2019.

[33] KK Williams, T Haltigin, and W H Pollard. Ground penetrating radar detection of ice wedge geometry: Implications for climate change monitoring. AGUFM, 2011: C41C-0420, 2011.

[34] Chandi Witharana, Md Abul Ehsan Bhuiyan, Anna K Liljedahl, Mikhail Kanevskiy, Howard E Epstein, Benjamin M Jones, Ronald Daanen, Claire G Griffin, Kelcy Kent, and Melissa K Ward Jones. Understanding the synergies of deep learning and data fusion of multispectral and panchromatic high resolution commercial satellite imagery for automated ice-wedge polygon detection. ISPRS Journal of Photogrammetry and Remote Sensing, 170:174-191, 2020.

[35] Yanhui You, Qihao Yu, Xicai Pan, Xinbin Wang, and Lei Guo. Application of electrical resistivity tomography in investigating depth of permafrost base and permafrost structure in tibetan plateau. Cold Regions Science and Technology, 87:19-26, 2013.

[36] Mingyi Zhang, Xiyin Zhang, Yuanming Lai, Jianguo Lu, and Chong Wang. Variations of the temperatures and volumetric unfrozen water contents of fine-grained soils during a freezing-thawing process. Acta Geotechnica, 15 (3): 595-601, 2020.

[37] Weixing Zhang, Chandi Witharana, Anna K Liljedahl, and Mikhail Kanevskiy. Deep convolutional neural networks for automated characterization of arctic ice-wedge polygons in very high spatial resolution aerial imagery. Remote Sensing, 10 (9): 1487, 2018.

[38] S M Ali Zomorodian and Osama Hunaidi. Inversion of SASW dispersion curves based on maximum flexibility coefficients in the wave number domain. Soil Dynamics and Earthquake Engineering, 26 (8): 735-752, 2006.

The invention claimed is:

1. A method of quantifying a plurality of parameters of a subsurface structure comprising a region of interest, the method comprising the steps of:

with at least one vibratory source, emitting an input wave signal into the subsurface structure to cause generation of seismic wave signals in the subsurface structure;

with at least one receiver, acquiring and measuring the seismic wave signals from the subsurface structure, wherein surface wave signals comprise at least one first Rayleigh wave (R1) signal and at least one second Rayleigh wave (R2) signal associated with the region of interest;

generating, at a data processing apparatus, seismic data associated with measurements of the seismic wave signals;

determining, at the data processing apparatus, from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest;

wherein the method is non-invasive;

wherein the seismic data comprises a first phase velocity of the first Raleigh wave (R1) signal and a second phase velocity of the second Raleigh wave (R2) signal, wherein the first phase velocity and the second phase velocity are dependent on the plurality of parameters; and wherein a poromechanical dispersion prediction model associated with the plurality of parameters solves a parameter optimization problem to compute a predicted dispersion relation of the second Raleigh wave (R2) signal using an iterative process, wherein the iterative process comprises minimization of a model objective function.

2. The method of claim 1, wherein the predicted dispersion relation of the second Raleigh wave (R2) signal is used to interpret the surface wave signals measurements to determine an observed dispersion relation.

3. The method of claim 2, wherein a first plurality of samples within a parameter space are ranked based on a L2 norm between the observed dispersion relation and predicted dispersion relation.

4. The method of claim 3, wherein based on the ranking of the first plurality of samples, a neighborhood sampling method iteratively generates a second plurality of samples with a minimum loss function value within the parameter space of the poromechanical dispersion prediction model.

5. The method of claim 4, wherein the neighborhood sampling method comprises construction of Voronoi polygons comprising the second plurality of samples having the closest minimum loss function value to each other.

6. The method of claim 5, wherein optimization parameters are scaled between 0-1 to evaluate the Voronoi polygon limit, calculated as:

$$x_i = \frac{1}{2}(v_{k,i} + v_{j,i} + \frac{d_k^2 - d_j^2}{v_{k,i} - v_{j,i}}); i = 1, n$$

where i represents the dimension index; vk is the starting point (sample) calculated as i/nr where nr is a resample number in the neighbourhood algorithm; n is the number of dimension; vj is the normalized samples excluding the vk; the dk and dj are evaluated as:

$$d_k = \sum_1^n \left( \sqrt{v_{ki} - y_i} - \sqrt{v_{ki+1} - y_{i+1}} \right)$$

$$d_j = \sum_1^n \left( \sqrt{v_{ji} - y_i} - \sqrt{v_{ji+1} - y_{i+1}} \right)$$

where yi is the new sample generated through the Voronoi polygons by assuming a uniform distribution.

7. The method of claim 6, wherein the new sample is generated within bounds ($l_b$ and $u_b$), which is calculated as:

$$l_b = \text{Max}(0, \text{Max}(x_i[x_i \le v_{ki}]))$$

$$u_b = \text{Min}(1, \text{Min}(x_i[x_i \ge v_{ki}])).$$

8. The method of claim 1, wherein the region of interest comprises at least one of an active layer, permafrost layer, and unfrozen ground.

9. The method of claim 8, wherein the plurality of parameters comprises physical parameters comprising at least one of saturation degree of water, saturation degree of ice or porosity.

10. The method of claim 8, wherein the plurality of parameters comprises mechanical parameters associated with the region of interest are derived from the physical parameters, wherein the mechanical parameters comprise at least one of bulk modulus and shear modulus.

11. The method of claim 8, wherein the most likely physical properties of the active layer, permafrost layer, and unfrozen ground are determined based on the second plurality of samples having the closest minimum loss function value to each other.

12. A system for quantifying a plurality of parameters of a subsurface structure comprising a region of interest, the system comprising:

at least one vibratory source to emit an input wave signal into the subsurface structure to cause generation of seismic wave signals in the subsurface structure;

at least one receiver to acquiring and measure surface wave signals from the subsurface structure, wherein the seismic wave signals comprise at least one first Rayleigh wave (R1) signal and at least one second Rayleigh wave (R2) signal associated with the region of interest;

a data processing apparatus comprising a processor, a non-transitory computer-readable medium storing instructions which, when executed, cause the processor to perform operations comprising to at least:

generate seismic data associated with measurements of surface wave signals;

determine from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest; and wherein the at least one vibratory source is positioned on a surface of the subsurface structure.

13. The system of claim 12, wherein the at least one receiver is positioned on a surface of the subsurface structure.

14. The system of claim 12, wherein the instructions comprise a poromechanical dispersion prediction model associated with the plurality of parameters solves a parameter optimization problem to compute a predicted dispersion relation of the second Raleigh wave (R2) signal using an iterative process, wherein the iterative process comprises minimization of a model objective function.

15. The system of claim 14, wherein the predicted dispersion relation of the second Raleigh wave (R2) signal is used to interpret the surface wave signals measurements to determine an observed dispersion relation.

16. The system of claim 15, wherein a first plurality of samples within a parameter space are ranked based on a L2 norm between the observed dispersion relation and predicted dispersion relation.

17. The system of claim 16, wherein based on the ranking of the first plurality of samples, a neighborhood sampling method iteratively generates a second plurality of samples with a minimum loss function value within the parameter space of the poromechanical dispersion prediction model.

18. The system of claim 17, wherein the neighborhood sampling method comprises construction of Voronoi polygons comprising the second plurality of samples having the closest minimum loss function value to each other.

19. The system of claim 18, wherein optimization parameters are scaled between 0-1 to evaluate the Voronoi polygon limit, calculated as:

$$x_i = \frac{1}{2}(v_{k,i} + v_{j,i} + \frac{d_k^2 - d_j^2}{v_{k,i} - v_{j,i}}); i = 1, n$$

where i represents the dimension index; vk is the starting point (sample) calculated as i/nr where nr is a resample number in the neighbourhood algorithm; n is the number of dimension; vj is the normalized samples excluding the vk; the dk and dj are evaluated as:

$$d_k = \sum_1^n (\sqrt{v_{ki} - y_i} - \sqrt{v_{ki+1} - y_{i+1}})$$

$$d_j = \sum_1^n (\sqrt{v_{ji} - y_i} - \sqrt{v_{ji+1} - y_{i+1}})$$

where yi is the new sample generated through the Voronoi polygons by assuming a uniform distribution.

20. The system of claim 19, wherein the new sample is generated within bounds ($l_b$ and $u_b$), which is calculated as:

$$l_b = \text{Max}(0, \text{Max}(x_i[x_i \le v_{ki}]))$$

$$u_b = \text{Min}(1, \text{Min}(x_i[x_i \ge v_{ki}])).$$

21. The system of claim 12, wherein the region of interest comprises at least one of an active layer, permafrost layer, and unfrozen ground.

22. The system of claim 21, wherein the plurality of parameters comprises physical parameters comprising at least one of saturation degree of water, saturation degree of ice or porosity.

23. The system of claim 21, wherein the plurality of parameters comprises mechanical parameters associated with the region of interest are derived from the physical parameters, wherein the mechanical parameters comprise at least one of bulk modulus and shear modulus.

24. The system of claim 21, wherein the most likely physical properties of the active layer, permafrost layer, and unfrozen ground are determined based on the second plurality of samples having the closest minimum loss function value to each other.

25. A non-transitory computer-readable medium storing instructions which, when executed by a processor, cause a computing device to perform operations comprising:

with at least one vibratory source, emitting an input wave signal into the subsurface structure to cause generation of seismic wave signals in the subsurface structure;

acquiring seismic wave signals from a subsurface structure, wherein surface wave signals comprise at least one first Rayleigh wave (R1) signal and at least one second Rayleigh wave (R2) signal associated with the region of interest;

converting the seismic wave signals into seismic data;

determining from the seismic data a relationship between the at least one first Rayleigh wave (R1) signal and the at least one second Rayleigh wave (R2) signal;

wherein the at least one first Rayleigh wave (R1) signal is dependent on at least one of the plurality of parameters of the region of interest and the at least second Rayleigh wave (R2) signal is dependent on at least another of the plurality of parameters of the region of interest; and wherein the instructions comprise a poromechanical dispersion prediction model associated with the plurality of parameters solves a parameter optimization problem to compute a predicted dispersion relation of the second Raleigh wave (R2) signal using an iterative process, wherein the iterative process comprises minimization of a model objective function.

26. The non-transitory computer-readable medium of claim 25, wherein the predicted dispersion relation of the second Raleigh wave (R2) signal is used to interpret the surface wave signals measurements to determine an observed dispersion relation.

27. The non-transitory computer-readable medium of claim 26, wherein a first plurality of samples within a parameter space are ranked based on a L2 norm between the observed dispersion relation and predicted dispersion relation.

28. The non-transitory computer-readable medium of claim 27, wherein based on the ranking of the first plurality of samples, a neighborhood sampling method iteratively generates a second plurality of samples with a minimum loss function value within the parameter space of the poromechanical dispersion prediction model.

29. The non-transitory computer-readable medium of claim 28, wherein the neighborhood sampling method comprises construction of Voronoi polygons comprising the second plurality of samples having the closest minimum loss function value to each other.

30. The non-transitory computer-readable medium of claim 29, wherein optimization parameters are scaled between 0-1 to evaluate the Voronoi polygon limit, calculated as:

$$x_i = \frac{1}{2}\left(v_{k,i} + v_{j,i} + \frac{d_k^2 - d_j^2}{v_{k,i} - v_{j,i}}\right); i = 1, n$$

where i represents the dimension index; vk is the starting point (sample) calculated as i/nr where nr is a resample number in the neighbourhood algorithm; n is the number of dimension; vj is the normalized samples excluding the vk; the dk and dj are evaluated as:

$$d_k = \sum_1^n \left(\sqrt{v_{ki} - y_i} - \sqrt{v_{ki+1} - y_{i+1}}\right)$$

$$d_j = \sum_1^n \left(\sqrt{v_{ji} - y_i} - \sqrt{v_{ji+1} - y_{i+1}}\right)$$

where yi is the new sample generated through the Voronoi polygons by assuming a uniform distribution.

31. The non-transitory computer-readable medium of claim 30, wherein the new sample is generated within bounds ($l_b$ and $u_b$), which is calculated as:

$$l_b = \text{Max}(0, \text{Max}(x_i[x_i \le v_{ki}]))$$

$$u_b = \text{Min}(1, \text{Min}(x_i[x_i \ge v_{ki}])).$$

32. The non-transitory computer-readable medium of claim 25, wherein the region of interest comprises at least one of an active layer, permafrost layer, and unfrozen ground.

33. The non-transitory computer-readable medium of claim 32, wherein the plurality of parameters comprises physical parameters comprising at least one of saturation degree of water, saturation degree of ice or porosity.

34. The non-transitory computer-readable medium of claim 32, wherein the plurality of parameters comprises mechanical parameters associated with the region of interest are derived from the physical parameters, wherein the mechanical parameters comprise at least one of bulk modulus and shear modulus.

35. The non-transitory computer-readable medium of claim 32, wherein the most likely physical properties of the active layer, permafrost layer, and unfrozen ground are determined based on the second plurality of samples having the closest minimum loss function value to each other.

* * * * *